(12) United States Patent
Bellagamba

(10) Patent No.: US 8,928,932 B2
(45) Date of Patent: Jan. 6, 2015

(54) SYSTEM AND METHOD FOR CREATING MULTI-FORMATTED DOCUMENTS VIA AN ONLINE PORTAL

(75) Inventor: Timothy J. Bellagamba, Barrington Hills, IL (US)

(73) Assignee: Bell Litho, Inc., Elk Grove Village, IL (US)

( * ) Notice: Subject to any disclaimer, the term of this patent is extended or adjusted under 35 U.S.C. 154(b) by 470 days.

(21) Appl. No.: 13/506,282

(22) Filed: Apr. 9, 2012

(65) Prior Publication Data

US 2013/0265592 A1    Oct. 10, 2013

(51) Int. Cl.
*G06F 15/00* (2006.01)

(52) U.S. Cl.
USPC ............................. 358/1.6; 358/1.15; 726/21

(58) Field of Classification Search
USPC ........ 358/1.6, 1.12, 1.15, 403; 705/27.1, 408; 709/201, 217; 726/21; 715/201, 202, 715/209, 234
See application file for complete search history.

(56) References Cited

U.S. PATENT DOCUMENTS

| | | | |
|---|---|---|---|
| 7,268,896 B2 * | 9/2007 | Bellagamba et al. | ........ 358/1.12 |
| 7,287,218 B1 | 10/2007 | Knotz et al. | |
| 7,366,974 B2 | 4/2008 | Kalajian et al. | |
| 7,554,681 B2 * | 6/2009 | Bellagamba et al. | ........ 358/1.12 |
| 7,716,735 B2 * | 5/2010 | Bellagamba et al. | ........... 726/21 |
| 7,774,715 B1 | 8/2010 | Evans | |
| 7,979,793 B2 | 7/2011 | Miller et al. | |
| 8,001,192 B1 | 8/2011 | Papineau et al. | |
| 8,090,719 B2 | 1/2012 | Wade et al. | |
| 2002/0143822 A1 | 10/2002 | Brid et al. | |
| 2003/0172354 A1 | 9/2003 | Ponce | |
| 2005/0114784 A1 * | 5/2005 | Spring et al. | .................. 715/762 |
| 2006/0259371 A1 | 11/2006 | Perrier et al. | |
| 2007/0033059 A1 | 2/2007 | Adkins | |
| 2008/0010076 A1 | 1/2008 | McMahon et al. | |
| 2009/0016605 A1 | 1/2009 | Chao et al. | |
| 2009/0327351 A1 | 12/2009 | Malone et al. | |
| 2010/0313119 A1 | 12/2010 | Baldwin et al. | |
| 2011/0029906 A1 | 2/2011 | Hirai | |
| 2011/0078570 A1 | 3/2011 | Larsen | |
| 2011/0125586 A1 | 5/2011 | Evans | |

* cited by examiner

*Primary Examiner* — Vu B Hang
(74) *Attorney, Agent, or Firm* — Meroni & Meroni, P.C.; Charles F. Meroni, Jr.; Christopher J. Scott

(57) ABSTRACT

An on-line portal enables users in multiple locations to concurrently create varied marketing campaign materials by way of singular proxy templates. The user selects a promotion from predetermined approved location/client list. If the promotional document type contains a proxy template, the user may edit the proxy template, and link the proxy template to multiple documents such that edits to the proxy template are referenced by the linked documents and thus are concurrently built based on pre-approved rules governing the formats for the linked documents. The user is allowed to preview the documents for completeness and/or accuracy, and if acceptable may be placed into a shopping cart for checkout or order placement.

25 Claims, 18 Drawing Sheets

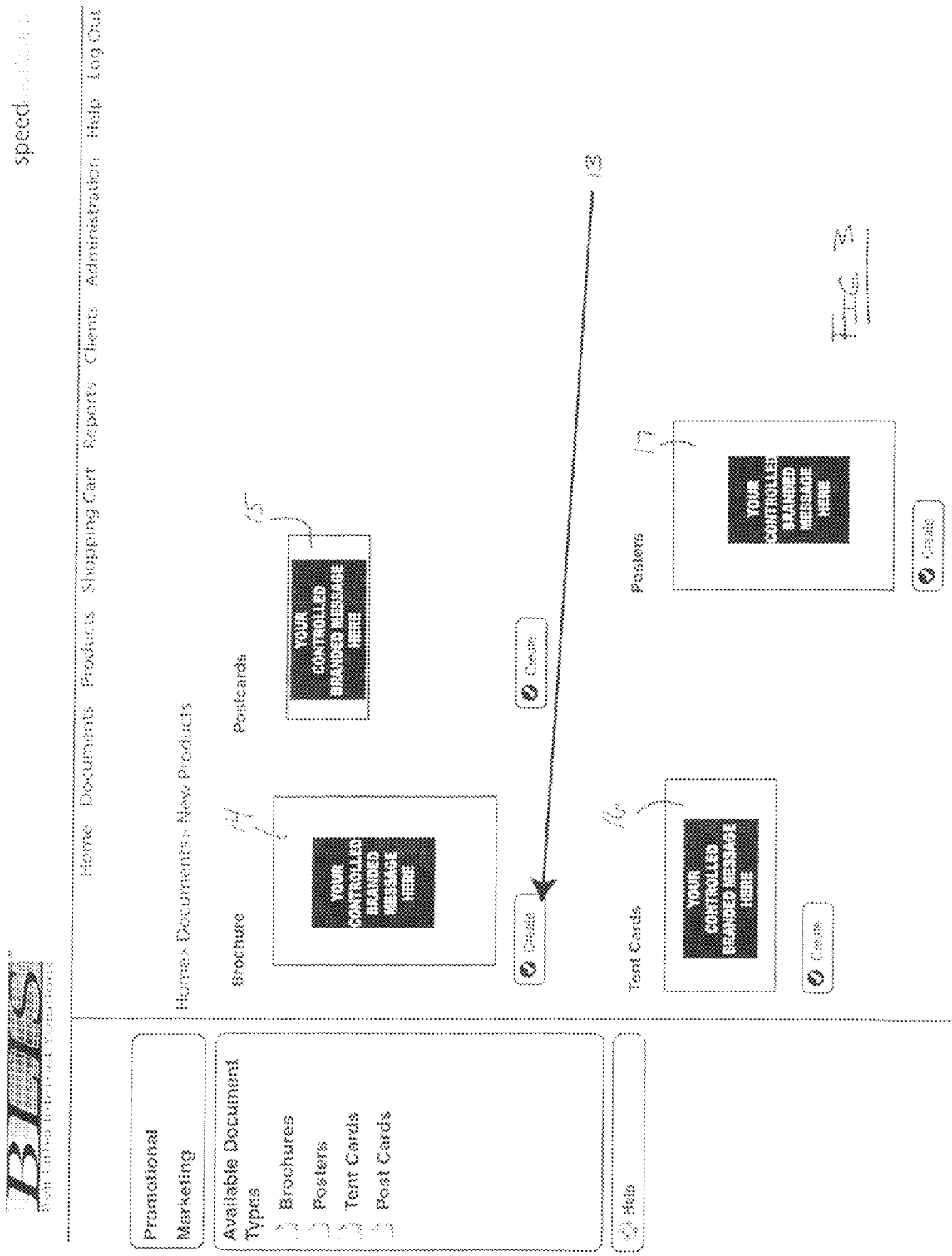

SYSTEM AND METHOD FOR CREATING MULTI-FORMATTED DOCUMENTS VIA AN ONLINE PORTAL

BACKGROUND OF THE INVENTION

1. Field of the Invention

The present invention generally relates to the field of advertising and/or marketing. More particularly, the present invention relates to a system and method for simultaneously creating multi-format marketing materials via on online portal in a network environment.

2. Description of the Prior Art

Given an audible prompt comprising a readily identifiable word, an experienced (and vocal) typesetter is able to instantaneously dissect the word into its component letters and recite the component letters aloud alphabetically. The recitation is reflexive, requiring little, if any, cognitive effort. The skill is developed over time with day to day typesetting experience and is simply reflective of the typesetter's conditioned response to perpetual workload as driven by consumer demand. The process of typesetting involves the presentation of textual material in an aesthetic form on paper or some other media. Before the development of innovations such as the dot matrix, inkjet, and laser jet printers, printed material was produced in print shops. In spite of centuries of innovation, the principle of printing remains the same: either a particular part of the page is marked or not marked with ink. This has remained true at the microscopic level even for halftone and four-color printing. Typesetting is the technology of deciding which parts of the paper should be marked, and printing is the technology of making the marks. However, the two are not rigidly separated: for example, ink flows during the printing process, and type design has to take into account the dynamics of ink on paper.

With the advent of computers, the inevitability of inventive computer-based typographical methodologies became apparent and thus the skill here anecdotally described may very well be shelved and replaced with computer means. In this last regard, it will be noted that software developers continually develop electronic means for achieving inventive end results. Service industries, such as the printing industry, for example, have seen rapid growth in the use of web-based interface means for enabling consumers to order printing services and/or printed products. In this regard, a number of inventive systems and methods have been developed as a means to embrace consumer demands and provide the marketplace with quicker, more efficient ways to meet printing or publishing needs. Two of the more pertinent U.S. patent disclosures describing web-based network methodologies for providing consumers of printed matter with quicker, more efficient ways to meet consumer demands are described hereinafter.

U.S. Pat. No. 6,611,349 (149 patent), which issued to Vogt et al., discloses a System and Method of Generating a Printing Plate File in Real Time using a Communication Network. The '349 patent teaches a printing and publishing system which generates a printing plate ready file from data provided remotely in real time using a communication network. The printing and publishing system includes a central service facility and an end-user facility and/or a printing company facility. The end user facility provides page building operations allowing the design and construction of pages from images, text, and data available via the communication network. The central service facility provides storage, file processing, remote access, and content management operations. File processing operations include generating a plate-ready file from pages designed at the end user facility. The plate-ready file has a file format capable of high resolution and is ready for creation of a printing plate. The printing company facility provides printing operations for producing a printing plate from the plate-ready file.

U.S. Pat. No. 6,738,155 ('155 patent), which issued to Rosenlund et al., discloses a System and Method of Providing Publishing and Printing Services via a Communications Network. The '155 patent teaches a printing and publishing system providing prepress, content management, infrastructure, and workflow services to system subscribers in real time using a communication network. The printing and publishing system includes a central service facility and an end-user facility and/or a printing company facility. The end user facility provides page building operations allowing the design and construction of pages from images, text, and data available via the communication network. The printing company facility provides imposition operations allowing the setting of pages on a particular plate as well as positioning and orientation of pages on the plate.

The central service facility provides storage, file processing, remote access, and content management operations. Content management operations include the capture, organization, archival, retrieval, and reuse of electronic files containing any one of text, graphics, photos, artwork, full pages, audio, video, and completed projects. Content management operations further include the organization and cataloging of file content for browsing, searching, and retrieving of files and data.

U.S. Pat. Nos. 7,268,896; 7,554,681; 7,716,735; and 7,814,560, which issued to Bellagamba et al., build upon the disclosures set forth in Vogt et al. and Rosenlund et al. by providing a certain system and method operable via an on-line publishing portal for controlling brand integrity in a network environment. The present invention has grown out of the state of the art disclosed by Bellagamba et al. and others with a view toward enabling marketing specialists to simultaneously format a wide variety of documents via a single operation. The state of the art relating to document creation, document editing, and document formatting tools that enable users to create, edit, and format documents for publication is somewhat well-developed. Some of the more pertinent art relating to document creation and the like are briefly described hereinafter.

U.S. Pat. No. 7,287,218 ('218 patent), which issued to Knotz et al., discloses a Dynamic Publication of Information from a Database. The '218 patent describes certain systems and methods for electronic management configured so that content is stored apart from the information for formatting the content. A data structure for the content may be initially defined, and content items may be stored in the data structure. Formatting information may be stored separately from the content in the form of a template. To publish formatted content, the stored content may be merged with the template. Specialized tags may be included in the template to permit added publishing functionality. In this manner, the system can easily manage large volumes of content and deliver the content to a variety of specialized target devices.

U.S. Pat. No. 7,366,974 ('974 patent), which issued to Kalajian et al., discloses a System and Method for Managing Template Attributes. The '974 patent redefines the concept of a template as a set of template attributes, such as font types and color schemes that are accessed by document-generating applications to provide uniform functionality across an organization.

The template attributes are stored and distributed throughout an organization in lieu of full document templates in order to reduce storage and transmission bandwidth requirements. The template attributes are distributed from a global server to regional servers and then to user workstations to facilitate propagation and enforcement of organization-wide document formatting protocols.

U.S. Pat. No. 7,774,715 ('715 patent), which issued to Evans, discloses a System and Method for Computer Created Advertisements. The '715 patent describes a computerized method for a user to create an advertisement by displaying a plurality of advertising formats for selection by a user; displaying a template corresponding to a selected advertising format; displaying a plurality of product references for selection by the user; displaying on the template a selected product reference to create a proposed advertisement; and creating a preview of the proposed advertisement, all of which may be implemented using the Internet.

The invention further relates to a computerized system for creating an advertisement that comprises a template database for storing advertising formats; a product database for storing product references; and a computer to access the databases. Preferably, the user has a network interface such as Internet access that permits access via a remote location, software to permit a user to specify specifications such as quantity; printing information, ship date, paper type, pricing information, and payment information, and may be configured to receive images and text for new products.

U.S. Pat. No. 7,979,793 ('793 patent), which issued to Miller et al., discloses a Graphical Creation of a Document Conversion Template. The '793 patent describes a template creation system enabling a graphical selection of one or more fields from within a database system. The template creation system identifies a source format of the received fields that can be exported from the database system. The template creation system identifies a target format readable by a document editing system.

For example, the document editing system may be a word processing application that stores files in an application-specific format. The template creation system creates one or more template rules based on the identified source and target formats for converting the data from the source format to the target format. The template rules may then be stored in an XSLT style sheet.

U.S. Pat. No. 8,001,192 ('192 patent), which issued to Papineau et al., discloses a Method and Apparatus for Automatically Generating Custom Format Messages based on Message Destination. The '192 patent describes a method and apparatus for generating custom format messages whereby upon user selection of a message-destination, application logic identifies a set of template customization data corresponding to the message-destination and uses the template customization data to customize a generalized message template, so as to produce a custom format message. Advantageously, a single messaging application can thereby be made to produce custom format messages respectively for many different message-destinations.

U.S. Pat. No. 8,090,719 ('719 patent), which issued to Wade et al., discloses an Adaptive Page Layout Utilizing Block Level Elements. The '719 patent describes computerized methods and systems for formatting a page layout according to form factors of a display area. Initially, search results are received and dynamically converted into respective block-level elements, where each of the block-level elements is associated with a portion of content from one of the received search results. Form factors are retrieved from a graphical user interface.

Typically the form factors are associated with properties of a display area initiated to present the search results. At least one adaptive template is selected according to the retrieved form factors. The portion of content of each of the block-level elements is formatted based on at least one adaptive template. Also, the adaptive template is utilized to establish content panes within the page layout, as directed by the form factors. These content panes are populated with one or more of the block-level elements.

United States Patent Application Publication No. 2002/0143822, which was authored by Brid et al. discloses a Method and Apparatus for Applying an Adaptive Layout Process to a Layout Template. The publication describes a system that retrieves a first template associated with data identified in a data request. A second template is generated using the first template and a device description, which is associated with a device generating the data request. The first template is device independent and the second template is associated with the specific device generating the data request as well as the first template.

The second template defines a data presentation format for displaying the requested data on the type of device that generated the data request. The second template is stored in a cache, which allows the second template to be used with multiple sets of data without regenerating the template. The requested data is retrieved from a data source and formatted based on the second template. The formatted data is then transmitted to the device generating the data request.

United States Patent Application Publication No. 2003/0172354, which was authored by Martinez Ponce, discloses an Administration of Customized Document Production System and Method. This publication describes a method of administrating production of a customized document including the designing and enabling use of at least one intelligent template for the customized document, retrieving and customizing the at least one intelligent template for the customized document to create an intelligent document, including merging variable data with the at least one intelligent template and modifying a format of the at least one intelligent template to accommodate the variable data and create the intelligent document, producing the customized document based on the intelligent document, and monitoring at least one of designing and enabling use of the at least one intelligent template, retrieving and customizing the at least one intelligent template, and producing the customized document.

United States Patent Application Publication No. 2006/0170948, which was authored by Kobashi, discloses a Document Processing Apparatus, Document Processing Method and Program. This publication describes a document processing apparatus capable of, when acquiring a document based on a template file created by a variable printing system after converting the document into its own format, constructing a document in a format in which a concept of a record is introduced and preferably enabling operations for the unit of the concept of the source record, a document processing method and a program. In a computer which issues to a printer a print job for printing document data in which specified variable data is put into specified areas, template data into which the variable data can be merged is imported based on records; a segment is tentatively set for the template data, for each imported record; and the template data in which predetermined variable data is merged at predetermined areas is acquired on the basis of a record for which a segment is tentatively created.

United States Patent Application Publication No. 2006/0259371, which was authored by Perrier et al., discloses Systems and Methods for Managing and Displaying Dynamic and Static Content. This publication describes systems, methods, and computer-readable mediums for dynamically generating a document including storing a plurality of static content, information related to a user of the document, and a plurality of dynamic content associated with each of a plurality of categories associated with user information, storing a template including predetermined areas for static content and dynamic content, selecting at least one of the stored dynamic content based on the user of the document, and dynamically generating the document including the plurality of static content and the selected at least one dynamic content, wherein the dynamically generated document is displayed on a display.

Unites States Patent Application Publication No. 2007/0033059, which was authored by Adkins, discloses Multi-Format, All Media, Creation Method, Event Marketing Software. This publication describes a media production method in which multiple events are created and managed. Events are created using the selection of templates and data bases. Each template can be transformed into multiple media formats. A user can populate a data base, where this data base will serve each media format requested by user. The embedded fields and the media content are not immediately joined until user initiates a preview of same. This method of fulfilling multiple media formats allows flexibility for the user to easily sample different formats with different template options without having to discard work because the data base represents the content.

The pre-made template represents a depository for user's media and content and can be formatted into different media formats and styles. An advantage this method allows for a user to create a DVD, web site and an invitation without having to learn media authoring skills. Additionally, this method allows user to create uniform promotional items using a single program. This method also allows for more intimate commercial partnering between consumers and the business they choose to gift register with. This partnering method provides logo placement for the commercial entity and uniquely special treatment for event customers in the way of special items and time sensitive discounts based on specific items requested by customer. An administrative area is provided to store and manage all data bases and media content.

United States Patent Application Publication No. 2008/0010076, which was authored by McMahon et al., discloses a System and Method for Creating Dynamic Electronic Publications. This publication describes a method for creating a dynamic electronic publication including the steps of importing one or more data assets into a publication design environment and identifying one or more features associated with one or more of the data assets. Each data asset and any features associated with each data asset are converted to a browser-readable file format and arranged based on a user-defined layout. A browser-compatible file map of the data assets is created based to the user-defined layout. An electronic publication associated with the file map is generated. The electronic publication includes browser-readable code that, when executed by a web-browser, displays the one or more data assets and any features associated with each data asset in accordance with the user-defined layout.

United States Patent Application Publication No. 2009/0016605, which was authored by Chao et al., discloses a System and Method for Crating an Editable Template from a Document Image. This publication describes a system whereby the spatial characteristics and the color characteristics of at least one region of a document are identified. A set of characteristics of a graphic, representation within the region are then determined without the necessity of recognizing a character comprising the graphic representation. An editable template is then created comprising a second region having the same spatial characteristics and the same color characteristics of the at least one region of the document and comprising a second graphic representation which is defined by the set of characteristics of the first graphic representation.

United States Patent Application Publication No. 2009/0327351, which was authored by Malone et al., discloses an Electronic Product Design. This publication describes automated electronic document design systems and method for designing and modifying product templates. When a user initiates a product design session, a product template is presented for user editing and a product description identifier is assigned to the product being designed. Document templates are assembled from individual composite elements.

The individual identifiers of the component elements that make up the template being viewed by the user are associated with the description identifier. Tools are provided to allow a user to change one or more of the composite elements of the template. When a user changes an element, the identifier of the newly selected element is associated with the description identifier. Component elements of one template can be individually used, as appropriate, to prepare customized templates for another part of the same document or for different documents.

United States Patent Application Publication No. 2010/0313119, which was authored by Baldwin et al., discloses an In-Line Dynamic Text with Variable Formatting. This publication describes Techniques for configuring a dynamic document template and for generating formatted documents. A data source is associated with a dynamic document template. Static text is inserted into the template. One or more placeholders are inserted in the template. Expressions may be associated with static text and placeholders in the template. Each expression may reference one or more data elements of the data source.

One or more formatted documents may be generated based on the dynamic document template. In the case of placeholders, a data element referenced by an expression associated with a placeholder may be displayed in a formatted document in place of the placeholder in a display format (e.g., a color, a font type, etc.) selected according to the expression. Likewise, a display format of static text may be selected based on an expression associated with the static text.

United States Patent Application Publication No. 2011/0029906, which was authored by Hirai, discloses a Report Format Setting Method and Apparatus, and Defect Review System. This publication describes a template edition screen on which to display components of a report as modules by OSD by use of icons. One of the icons is selected by use of a pointing device including a mouse. By a drag-and-drop operation, the icon is placed at a desired position in an output format setup area formed in the same screen. The icon is set in a desired size by another drag-and-drop operation.

Details of a module shown by the icon thus placed can be set up in a detail setup area in the same screen. Information on a format thus set up is retained as a template through a retention function, and accordingly can be used easily by simply calling the information. Moreover, the retained template can be edited as well. This makes it possible not only to create a new template, but also to modify an existing template.

United States Patent Application Publication No. 2011/0078570, which was authored by Larsen et al., discloses certain Document Creation and Management Systems and Methods. This publication describes certain systems and methods for document creation and management to facilitate creation of documents. An example document creation and management system is configured with an input component, a processing component, and a document creation component. A document creation and management systems can allow input of data in a customizable manner via talking (or recording), touching, typing, and/or clicking.

A document creation and management system may use customizable templates, so that a user, for example a physician, may more efficiently enter and review data, such as data related to a patient encounter. A navigator may import information, such as formatting and structure information, from a template to guide a user as to the input to be provided to generate a document according to the template. Document entries may be automatically sent for processing, which may include editing, transcription, encryption, etc, in a parallel or serial fashion. For example, dictation information may be automatically transcribed and/or processed.

United States Patent Application Publication No. 2011/0125586, which was authored by Evans, discloses a System and Method for Computer Created Advertisements. This publication describes a computerized method for a user to create an advertisement by displaying a plurality of advertising formats for selection by a user; displaying a template corresponding to a selected advertising format; displaying a plurality of product references for selection by the user; displaying on the template a selected product reference to create a proposed advertisement; and creating a preview of the proposed advertisement, all of which may be implemented using the Internet.

The invention further relates to a computerized system for creating an advertisement that comprises a template database for storing advertising formats; a product database for storing product references; and a computer to access the databases. Preferably, the user has a network interface such as Internet access that permits access via a remote location, software to permit a user to specify specifications such as quantity, printing information, ship date, paper type, pricing information, and payment information, and may be configured to receive images and text for new products.

From a review of these prior art disclosures and from a general consideration of other pertinent prior art generally known to exist, it will be seen that the prior art does not disclose a web-based or network-based system for providing access to a digital, proxy template which may be coupled to branding for messaging customers in multiple output formats (e.g. product labels, flyers, postcards, and posters) wherein the branded portions are controlled by a singular, ubiquitous source of control and wherein the offering portions are controlled by a plurality of localized control sources on an as-needed basis. The present invention contemplates such a system and certain methodologies associated therewith, as discussed in more detail hereinafter.

SUMMARY OF THE INVENTION

It is an object of the present invention to provide a means for creating a single message for placement on numerous document types, which message may comprise branding (such as an advertisement) in a cost effective manner when multiple users and locations are involved. The system and method of the present invention enables individuals at multiple locations access to branded and controlled elements at the same time in a controlled environment.

The invention is essentially a system and method for simultaneously creating multi-formatted documents with a uniform message while protecting an organization's branding that is typically associated with the uniform message. The methodology allows for personalizing, finalizing, publishing and delivery of web-based or web-constructed marketing materials in multiple formats so as to support a broad-based marketing campaign with optimized efficiency. This solution allows for digital distribution of: text, data, images and sound. Utilizing web-based medium-proxy templates, the originator can control the marketing messages for the various output formats, including content and all aesthetic elements.

These medium-proxy templates can be used by any organization in education, marketing support materials, advertisements, or virtually any printable or displayable message. The organization can provide password access to multiple users. This system provides ability to personalize and edit certain areas of the controlled message. Multiple users can operate the system at the same time. Once personalized, the messaged documents in multiple formats can remain digital for further analysis or print, or be output as a print ready or plate ready digital file, or stored for electronic display/publication. It can also be distributed in a digital form. This system requires limited or no training to produce final quality-controlled messages from a basal support system or platform that otherwise requires extensive skill or training.

The system thus can monitor and generate reports by facility, by item, or by individual transaction. The system provides a dynamic marketing tool for optionally branded items by providing proofs, scheduling, distribution and publishing of printable or displayable (branded) multi-formatted documents. An authorized individual can introduce and control information gaining economies of scale for replenishment of the items. The methodology, comprising a web-based server environment, enables organizations with multiple locations access while controlling the uniform (branded) message in multiple formats to support the marketing campaign.

Objects of the invention thus include a desktop marketing campaign system and methodology that (1) requires minimal instruction and/or training and is easy to use; (2) allows user to access and personalize a medium-proxy template for simultaneously rendering multi-formatted documents; (3) maintains branding standards; (4) maintains legal content requirements; (5) creates and maintains any unregistered trade dress, including an organization's look, style, and quality as presented in marketing material; (6) updates and distributes a marketing message in real time to multiple facilities; (7) saves money in reduced time for production and publishing/display of digital images; (8) allows multiple users from multiple locations to simultaneously access library elements; and (9) enables the generation of reports such as order history by facility, item, volume, etc.

To achieve these and other readily apparent objectives, the present invention provides an on-line portal or web-site. The web server obtains a list of all promotions from a database server, separates the promotions by category and builds a page to display previews of each promotion to the authenticated user. The process starts by prompting the user to login to the online portal. After the user inputs login data, the system authenticates the user. If the user provides valid credentials, the user is taken to the main page of the online portal. The user selects a promotion from predetermined approved location/client list.

The user, at the main page of the online portal, is provided with a number of prompts. One such prompt is a "create new document" prompt and when selected by the user operates to provide a selection of document templates broken into categories or groupings based upon document type. The system then prompts the user to select document format(s).

The web server instructs the document server to create a new document based on promotion selected, and document data is inserted into the database server. The web server generates a list of clients from the database server, and builds a web page to display the list to the user. The user then selects a client location from the list, and the web server queries the database server to determine if a logo file is associated with the selected client location.

If a logo file is associated with the selected client location, the web server then queries the database server to see if the document has any locations into which a logo should be inserted, and instructs the document server to load the logo into appropriate panels. Available client locations are provided to the user by way of the user's login information and authentication processes. Once the user selects a client location, the action will link the graphic logo to the documents to be created.

The web server then builds a list of editable panels/frames on the document after retrieving necessary information from database server, this list is transformed into an html representation and rendered onto the editor page where the user can select which part they which to edit. The user may then choose the text of the panel frame, and if he or she so elects may swap out the panel/frame. If a panel/frame is swapped in, the web server queries the database server to see if the new frame contains a medium-proxy document panel. If the new frame contains a medium-proxy document panel or template, the user is enabled via an edit button to edit the medium-proxy document panel or template.

If a frame or panel is swapped in, the web server further queries the database server to see if the new frame/panel contains a logo image box. If the swapped in panel/frame does contain a logo image box, the web server queries the database server to determine if the client location associated with the document has a logo image. If the client location associated with the document has a logo image, the web server instructs the document server to load the logo image into the appropriate box on the swapped in panel. In other words, the logo is pre-populated based on the client location selection.

The user may then edit text. The web server then saves the text data to the database server after applying dynamic document server formatting. The web server instructs the dynamic document server to pull updated text data from the database server for insertion/rendering. The user responds to the edit medium-proxy template prompt by clicking the edit proxy document (prompt) button.

The web server then queries the database server to determine whether a medium-proxy panel/template exists for the selected panel. If there is no existing medium-proxy panel/template, the web server instructs the dynamic document server to create an appropriate proxy document, and the user is re-directed to a medium-proxy panel/template setup page. The user may then select options to setup the medium-proxy panel/template, including formatting and general layout options.

The web server instructs the dynamic document server to make changes to the medium-proxy document based on layout/formatting options input by user in the previous step. The user may then input (text) data into medium-proxy panel/template based on layout chosen in previous steps. The web server saves textual data input to the database server, and the web server instructs the dynamic document server to render the medium-proxy document with all the user layout options and data input. The user may then preview the medium-proxy panel/template to ensure that layout/data are correct. If everything is ok, user clicks insert button.

The dynamic document server may then render a .pdf file format of the medium-proxy panel/template, and then inserts the .pdf file into an appropriate box on the original document. The user may then preview the composite document—if any further changes are desired, the user may return to edit medium-proxy panel/template functionality. If no further changes are desired, the user may place the medium-proxy panel/template (as linked to the selected output formats), into a shopping cart for checkout and/or further delivery/transmission.

With regard to the selected output formats, the web server queries the database server to determine whether the promotional medium-proxy panel/template the user just placed in the shopping cart has associated/linked documents. If the medium-proxy panel/template has associated/linked documents, the web server redirects the user to select an additional documents page. If the medium-proxy panel/template has no associated/linked documents, the web server directs the user to the checkout page.

The web server queries to the database server to determine which proxy-linked, variously formatted output document(s) are associated or linked to the original master document (comprising the medium-proxy template and an optional (locked for editing) branded microtemplate). The web server then builds a list of "Campaign with a Click" documents associated with the promotion being ordered (the web server pulls this data from the database server), and eliminates any such documents that have a medium-proxy panel/template requirement not met by the user's document. If a Campaign with a Click document requires a proxy document to be customized and the user's promotion does not have that proxy document filled out/created, then that Campaign with a Click document is not displayed.

The user may then select which Campaign in a Click documents he or she wants customized based on his or current medium-proxy panel/template. The web server builds a list of boxes to be customized on the selected Campaign with a Click document(s), and from this builds a list of corresponding boxes on the user's original medium-proxy panel/template. The web server further builds a list of box content, saving what panel/frame is located in each of the boxes on the list built in the previous step. From this list a list of corresponding content is built for the Campaign with a Click document(s) being created (i.e. data is pulled from database server).

The web server instructs the document server to load the content on the list generated in the previous step into each of the boxes on the list generated. The web server then builds a list from database server of boxes into which medium-proxy panel/template information should be loaded on the selected Campaign with a Click document(s). The web server instructs the dynamic document server to load the proxy panel/template into the designated Campaign with a Click documents in the appropriate boxes as determined. All campaign documents created will have the option to go back to the box list building step until all requested Campaign in a Click documents have been created and customized based on the user's original medium-proxy panel/template, placing each Campaign with a Click document in the cart as it is finished. The user is then directed to the shopping cart page where the Campaign with a Click documents can be previewed to ensure they look correct, at which time the user is enabled to check out.

Other objects of the present invention, as well as particular features, elements, and advantages thereof, will be elucidated or become apparent from, the following descriptions and the accompanying drawing figures.

BRIEF DESCRIPTION OF THE DRAWINGS

Other features of my invention will become more evident from a consideration of the following brief description of our patent drawings:

FIG. 3 is a screenshot depicting a new products page of the online portal according to the present invention showing Brochure, Postcards, Tent Cards, and Posters options.

Figure 4:
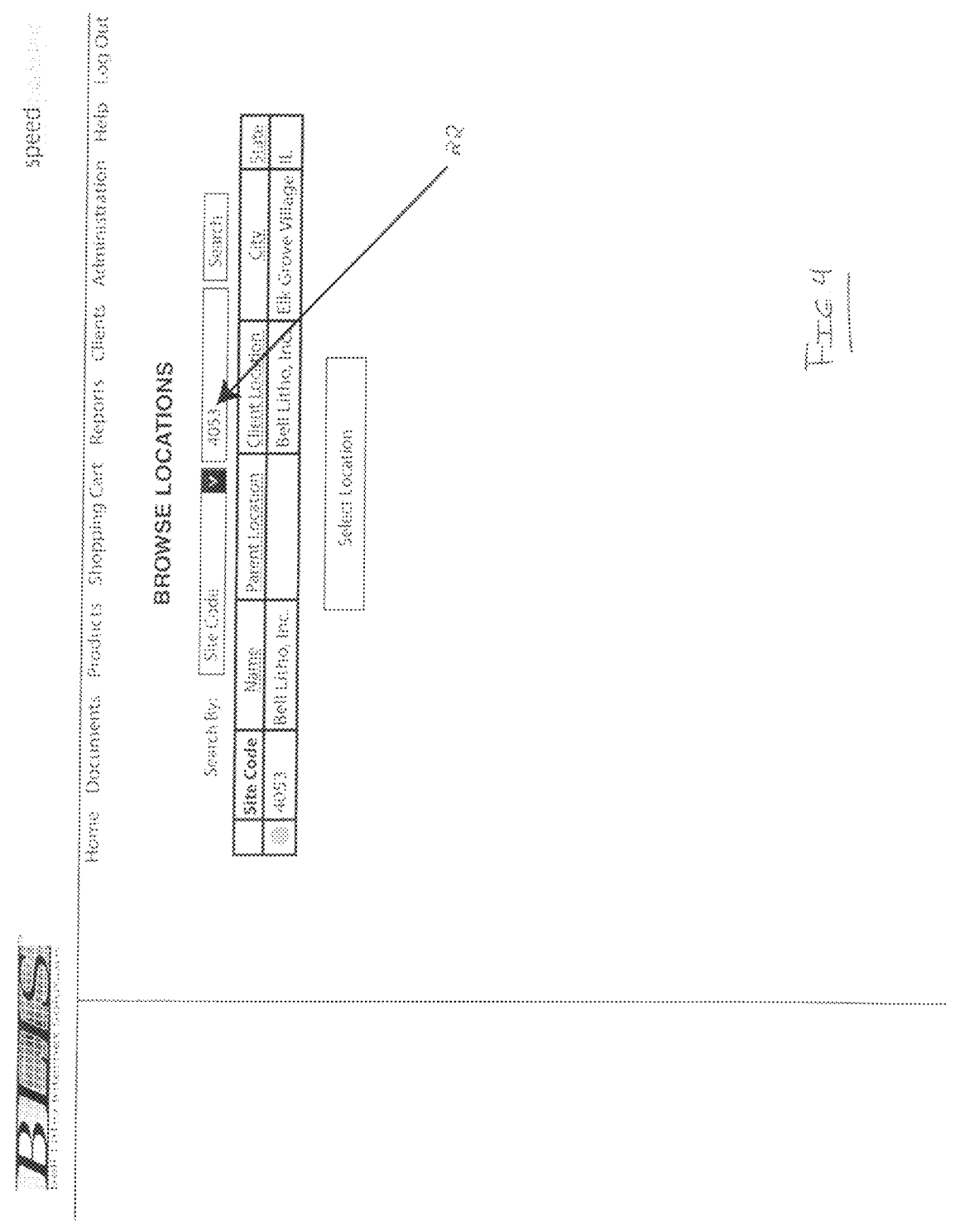

FIG. 4 is a screenshot depicting a browse locations page of the online portal according to the present invention.

Figure 7:
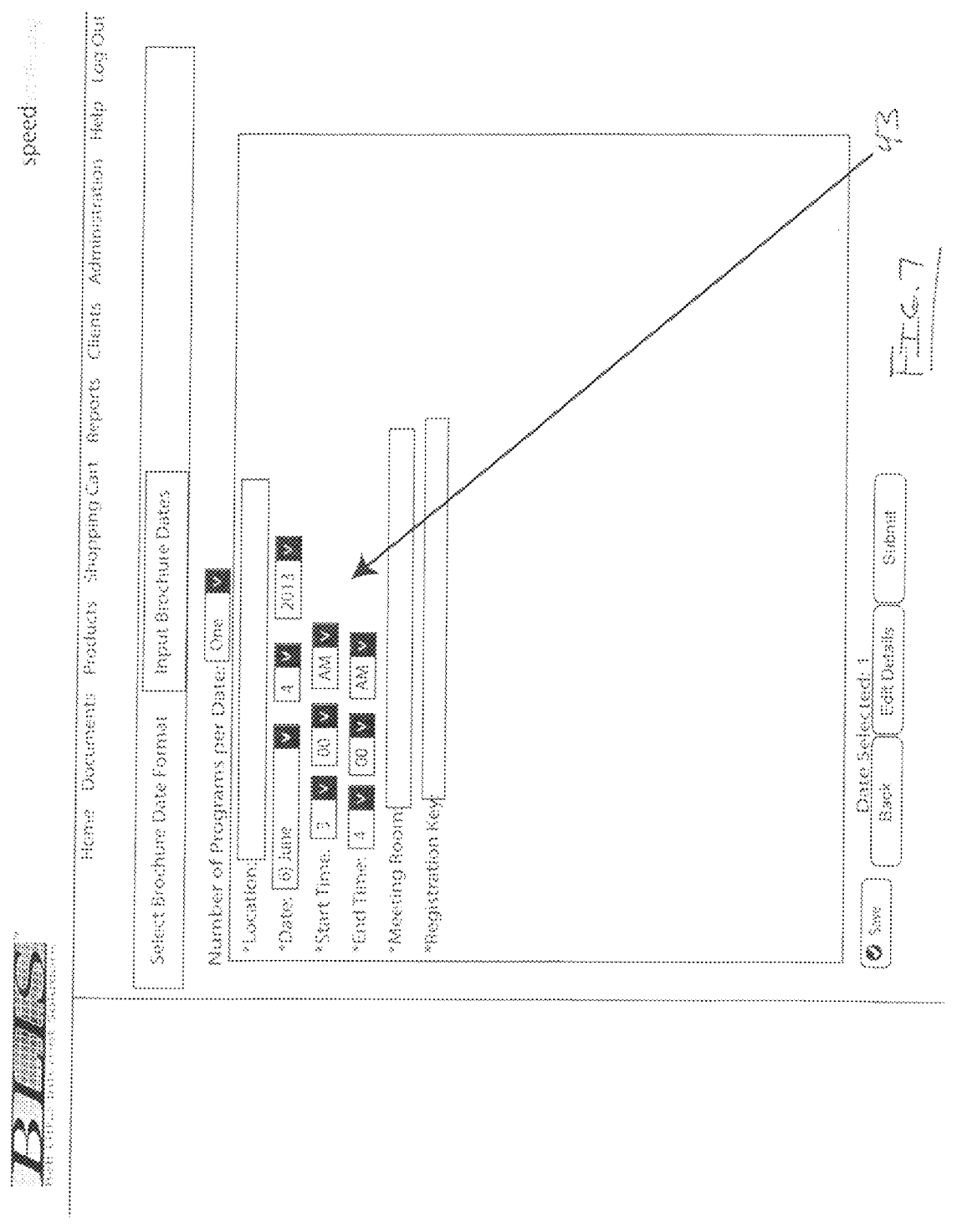

FIG. 7 is a screenshot depicting an input data page of the online portal according to the present invention.

Figure 10:
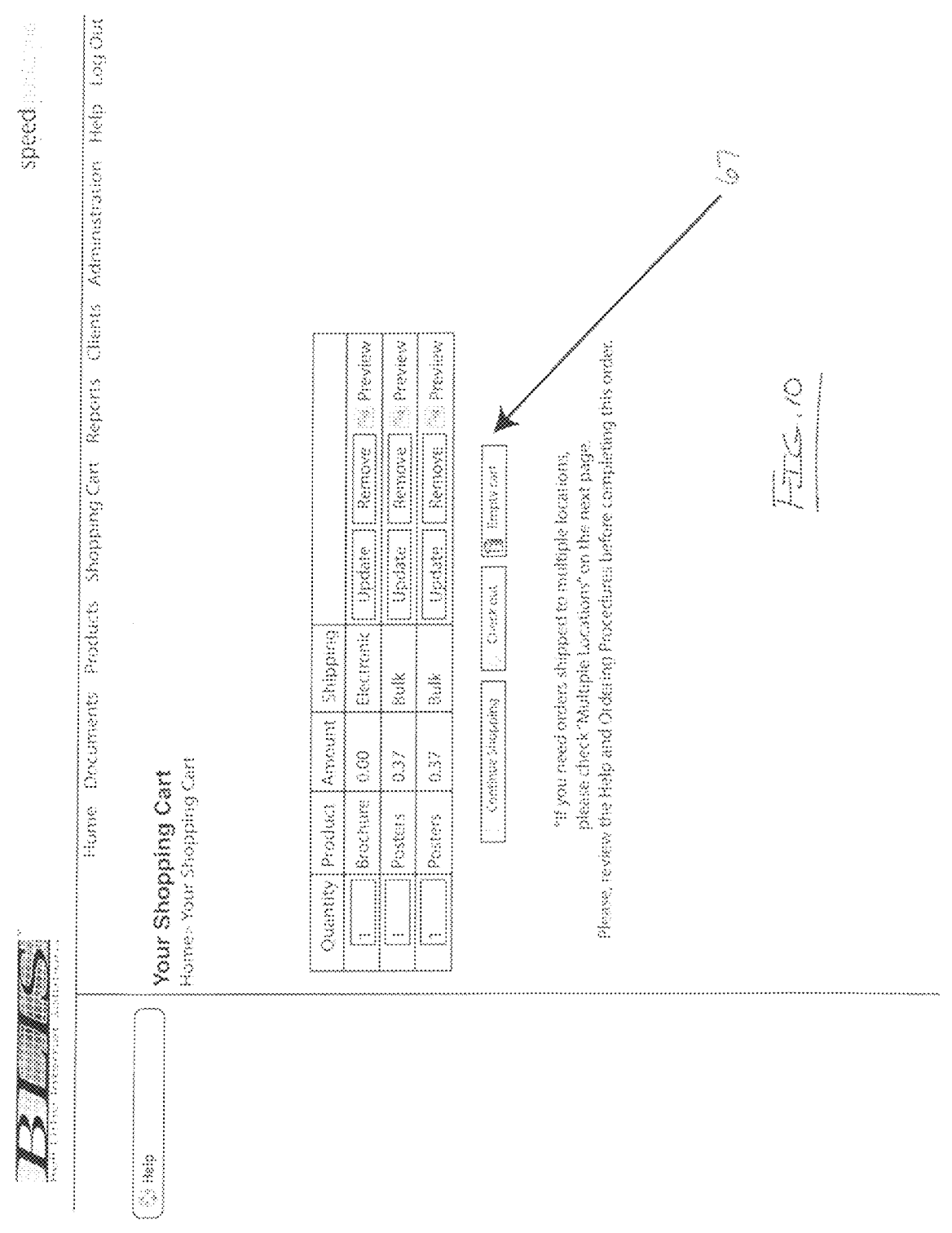

FIG. 10 is a screenshot depicting a shopping cart page of the online portal according to the present invention.

Figure 11:
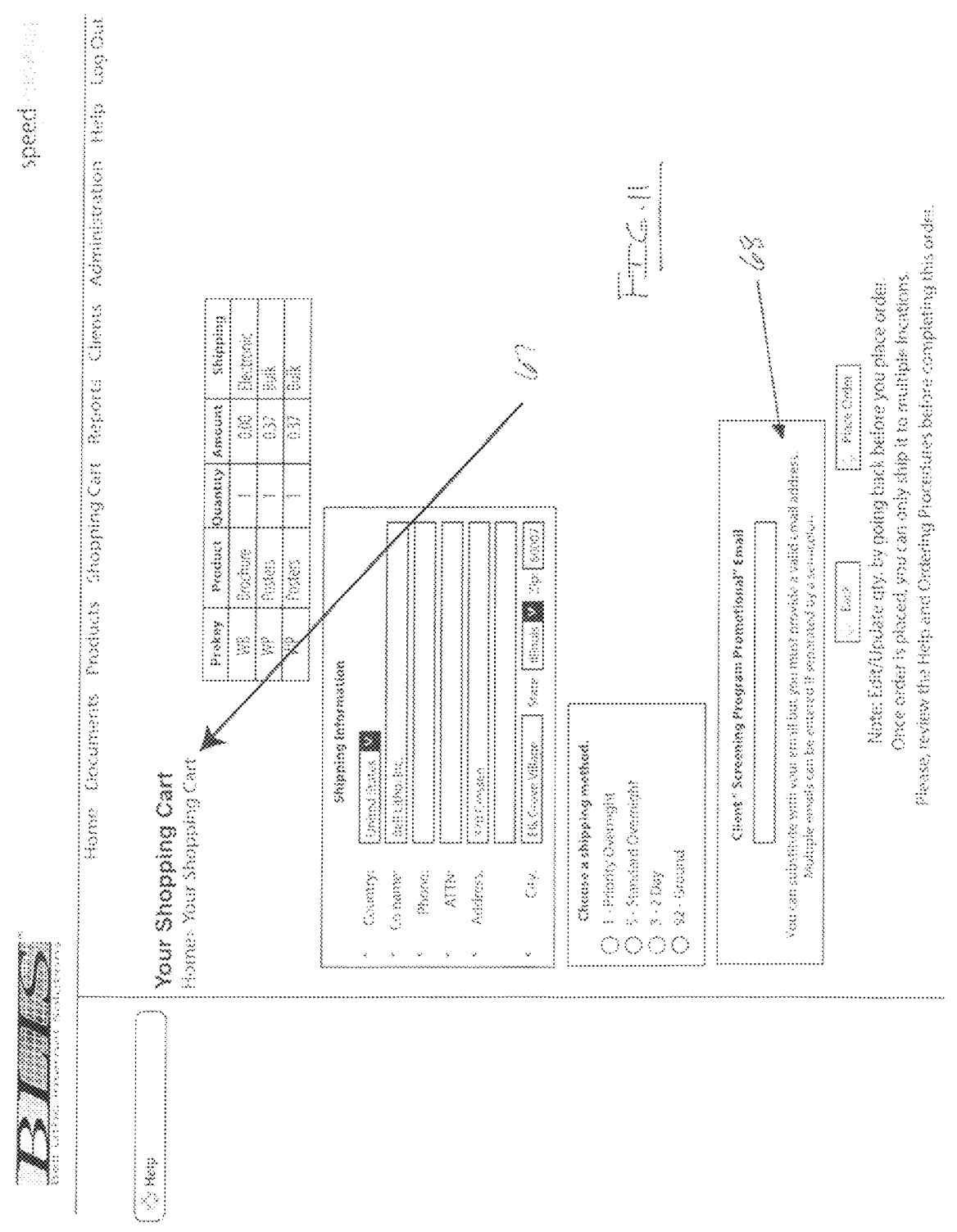

FIG. 11 is a screenshot depicting a shopping cart page and checkout page of the online portal according to the present invention.

DETAILED DESCRIPTION OF THE PREFERRED SYSTEM AND METHOD(S)

Figure 1:
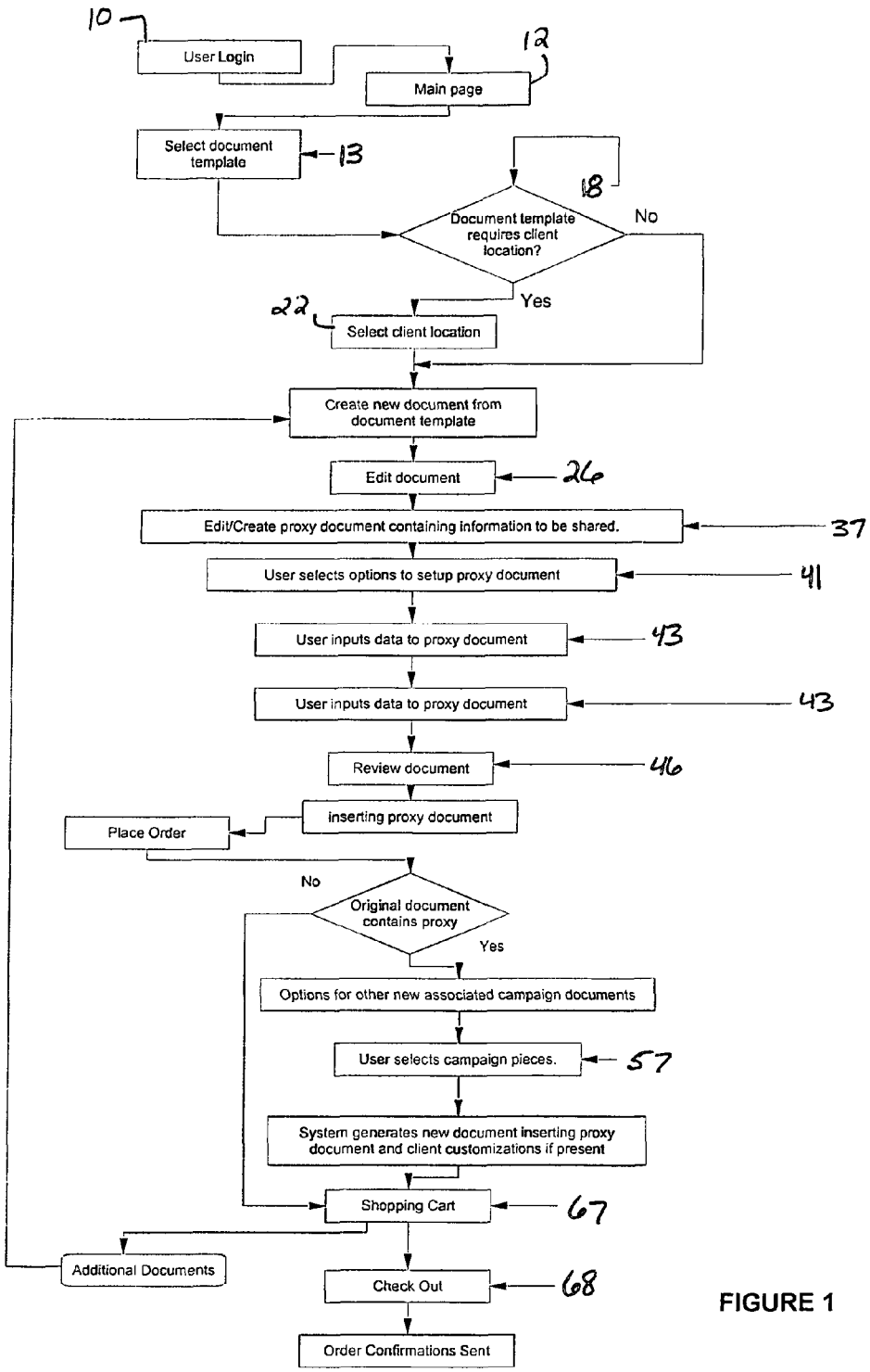
FIG. 1 is a flowchart diagram depicting an overview of the basic processes defining the flow of events according to the present invention.

Referring now to the drawings, the preferred system and methods provided by the present invention concerns certain means for creating a set of marketing materials that form the basis of a marketing campaign in which a singular, relatively uniform (branded) message may be compiled simultaneously upon on numerous document types in an electronic environment for expedited processing, display, and/or publication. The system and method contemplates a cost effective mechanism for enabling multiple users located in geographically differing locations to quickly and efficiently compile marketing campaigns with varied document types by linking output documents to a single editable proxy template such that the central proxy template and all the linked output document types may be composed simultaneously.

The invention is essentially a system and method for simultaneously creating multi-formatted documents with a uniform message while protecting an organization's branding that is typically associated with the uniform message. The methodology allows for personalizing, finalizing, publishing and delivery of web-based or web-constructed marketing materials in multiple formats so as to support a broad-based marketing campaign with optimized efficiency. This solution allows for digital distribution of: text, data, images and sound. Utilizing web-based medium-proxy templates, the originator can control the marketing messages for the various output formats, including content and all aesthetic elements.

Figure 2:
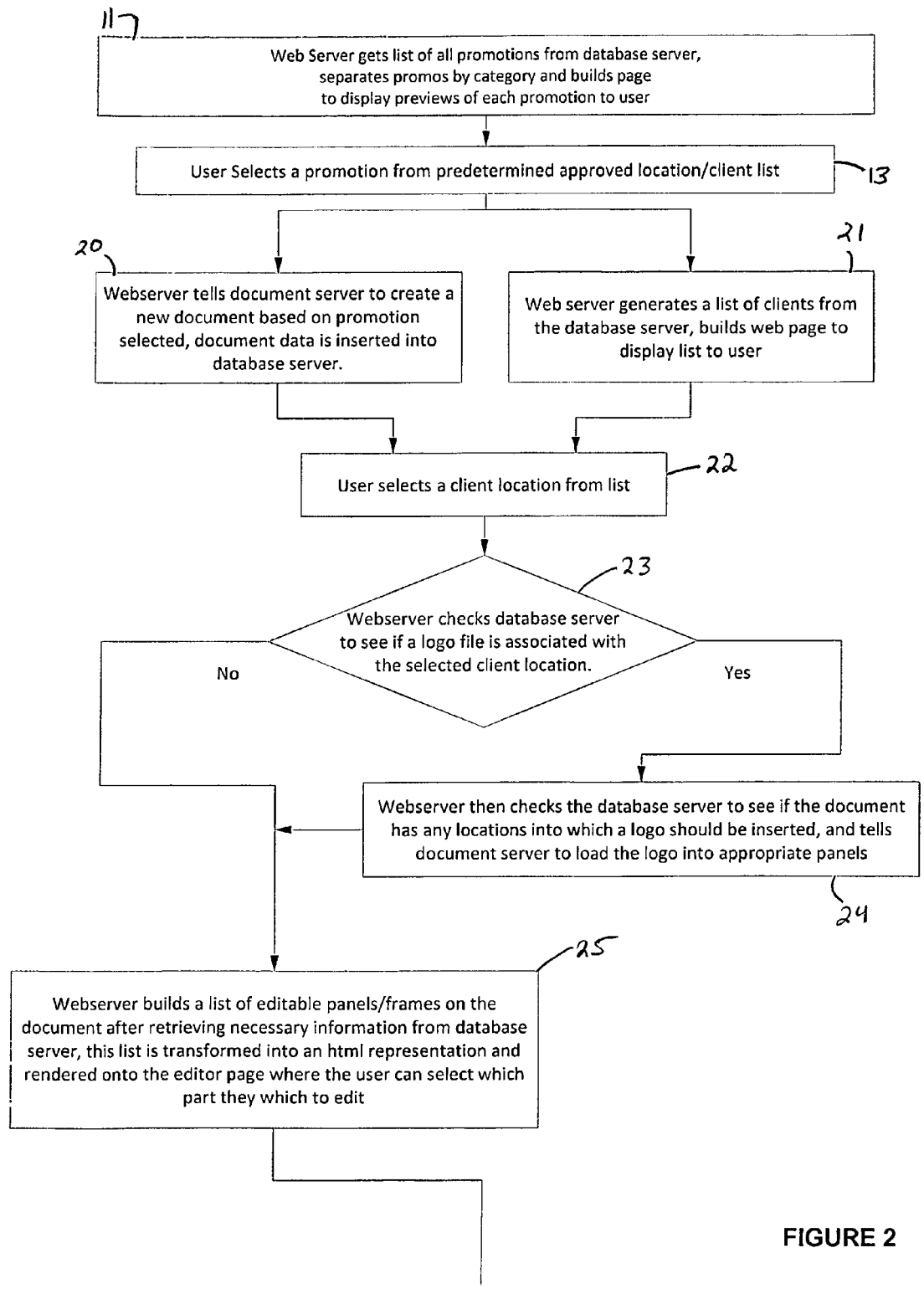
FIG. 2 is a fragmentary flowchart diagram depicting a first sequential series of processes according to the present invention.
Figure 2A:
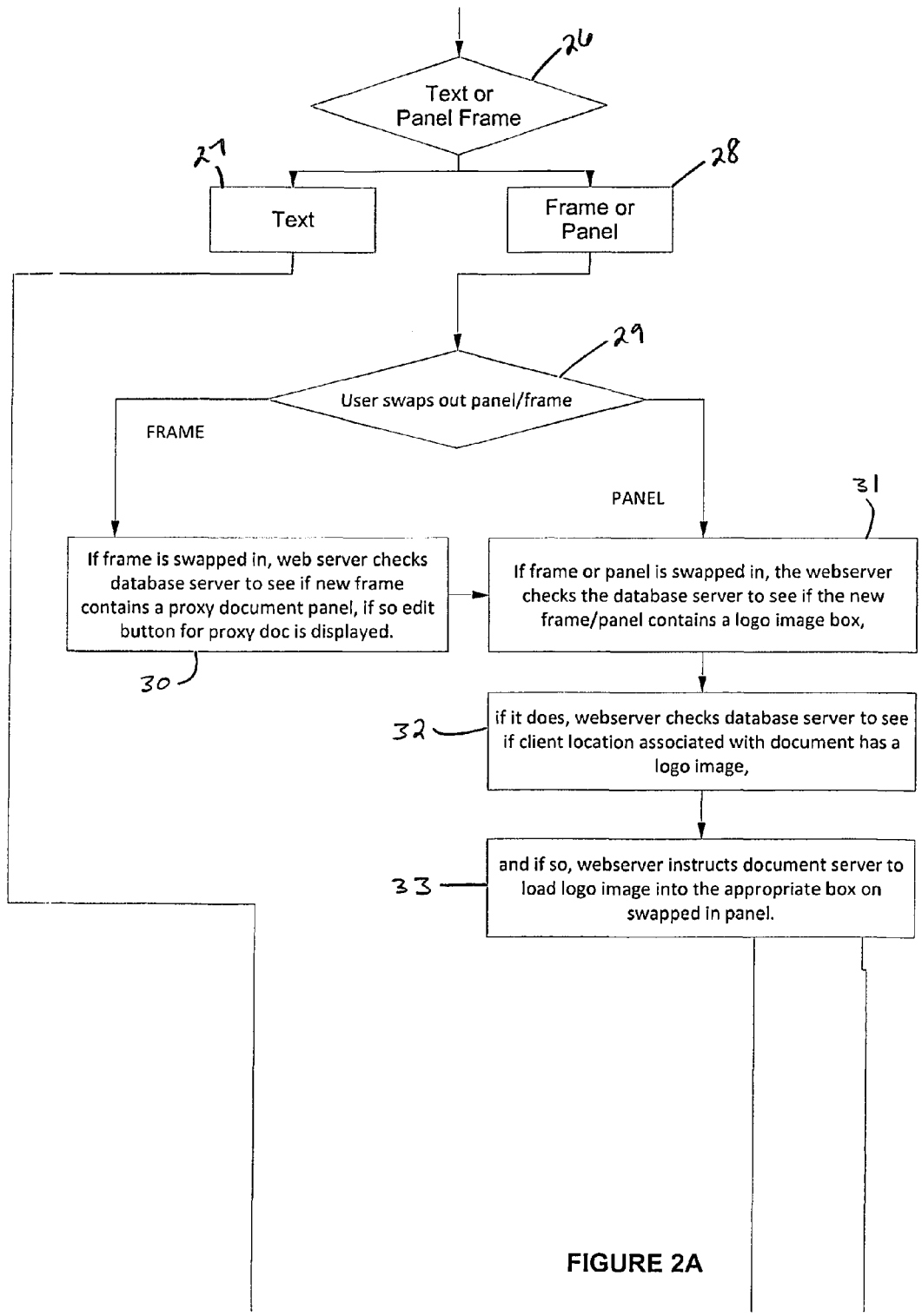
FIG. 2A is a fragmentary flowchart diagram depicting a second sequential series of processes according to the present invention.
Figure 2B:
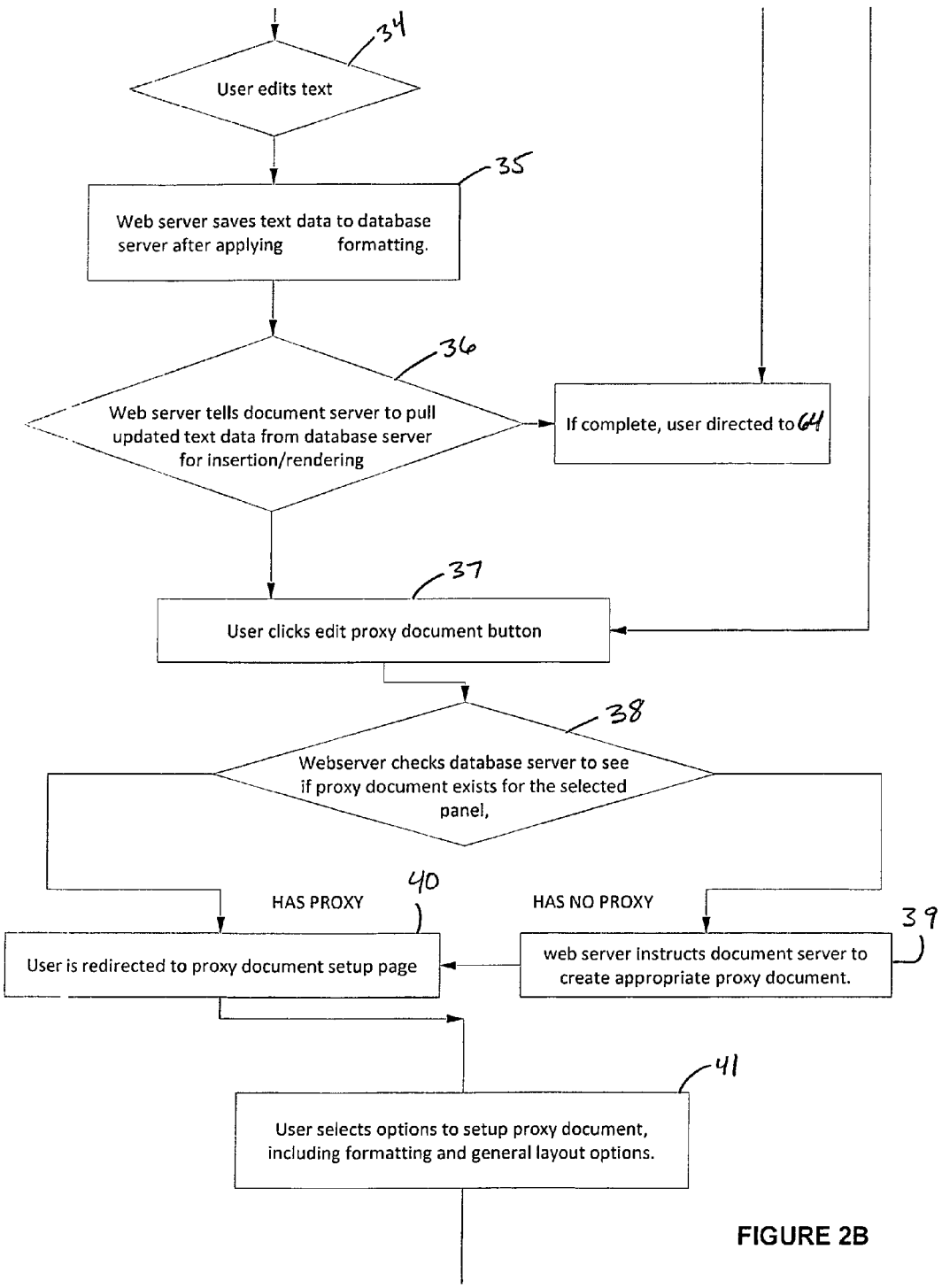
FIG. 2B is a fragmentary flowchart diagram depicting a third sequential series of processes according to the present invention.
Figure 2C:
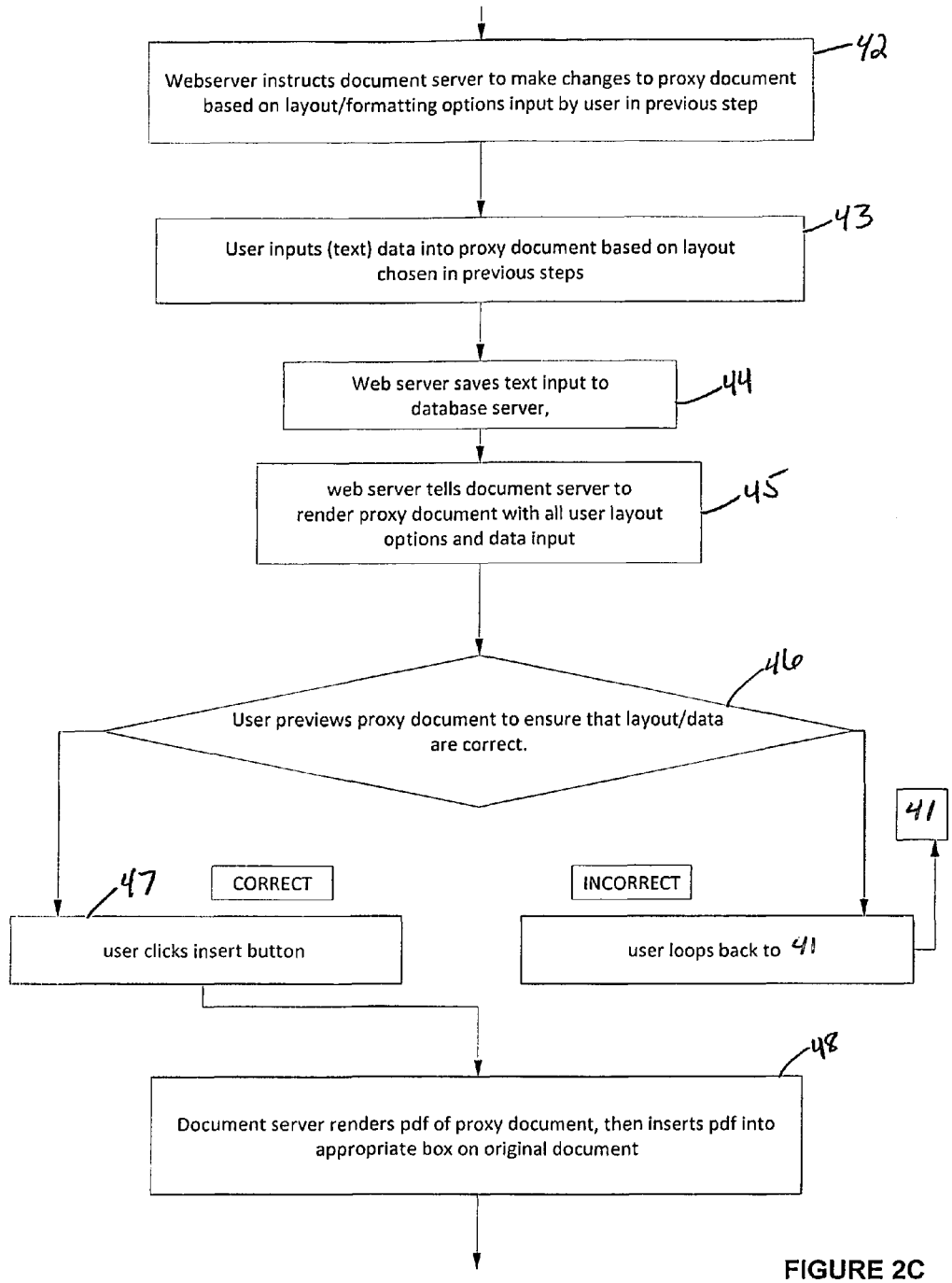
FIG. 2C is a fragmentary flowchart diagram depicting a fourth sequential series of processes according to the present invention.
Figure 2D:
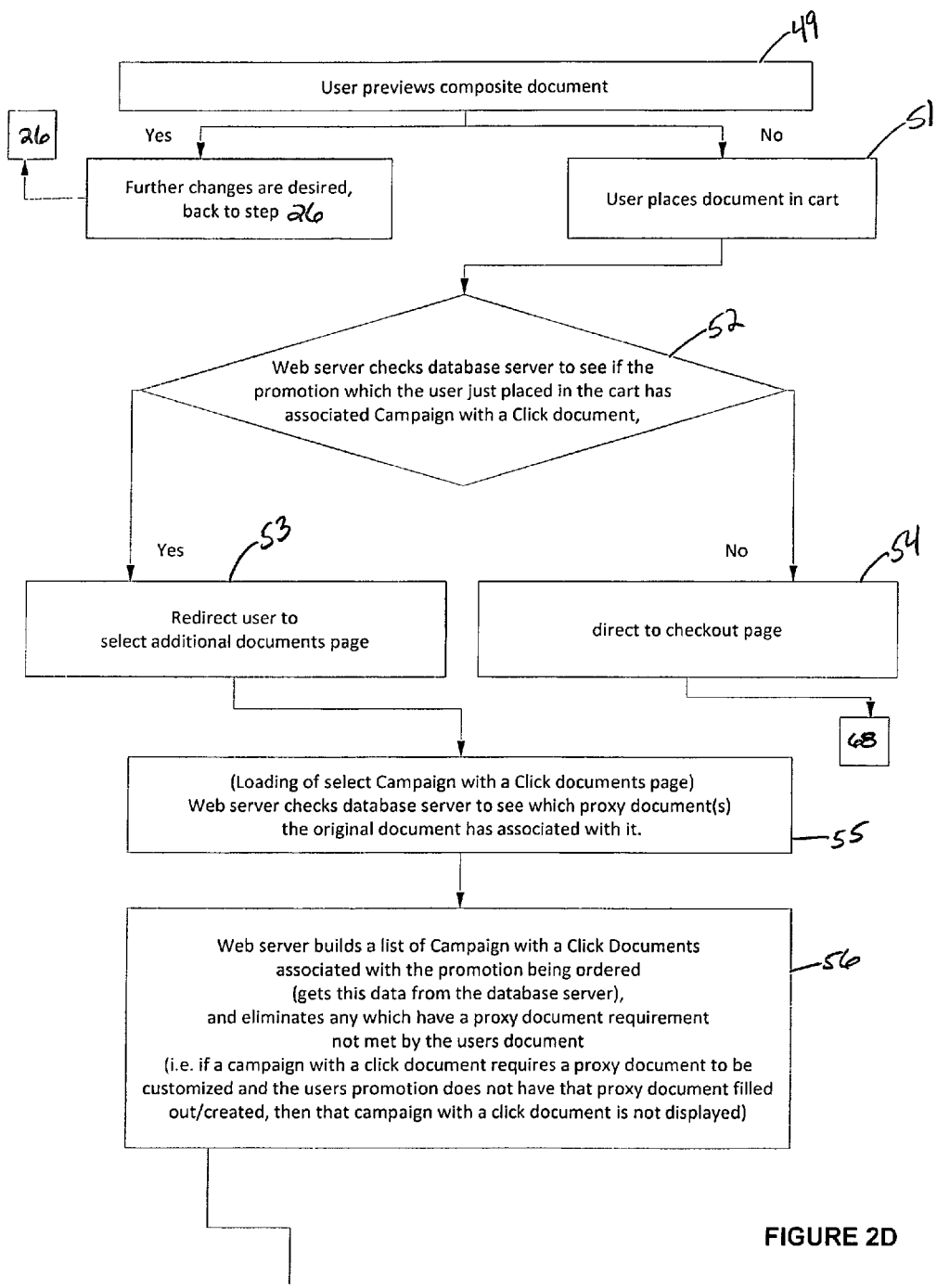
FIG. 2D is a fragmentary flowchart diagram depicting a fifth sequential series of processes according to the present invention.
Figure 2E:
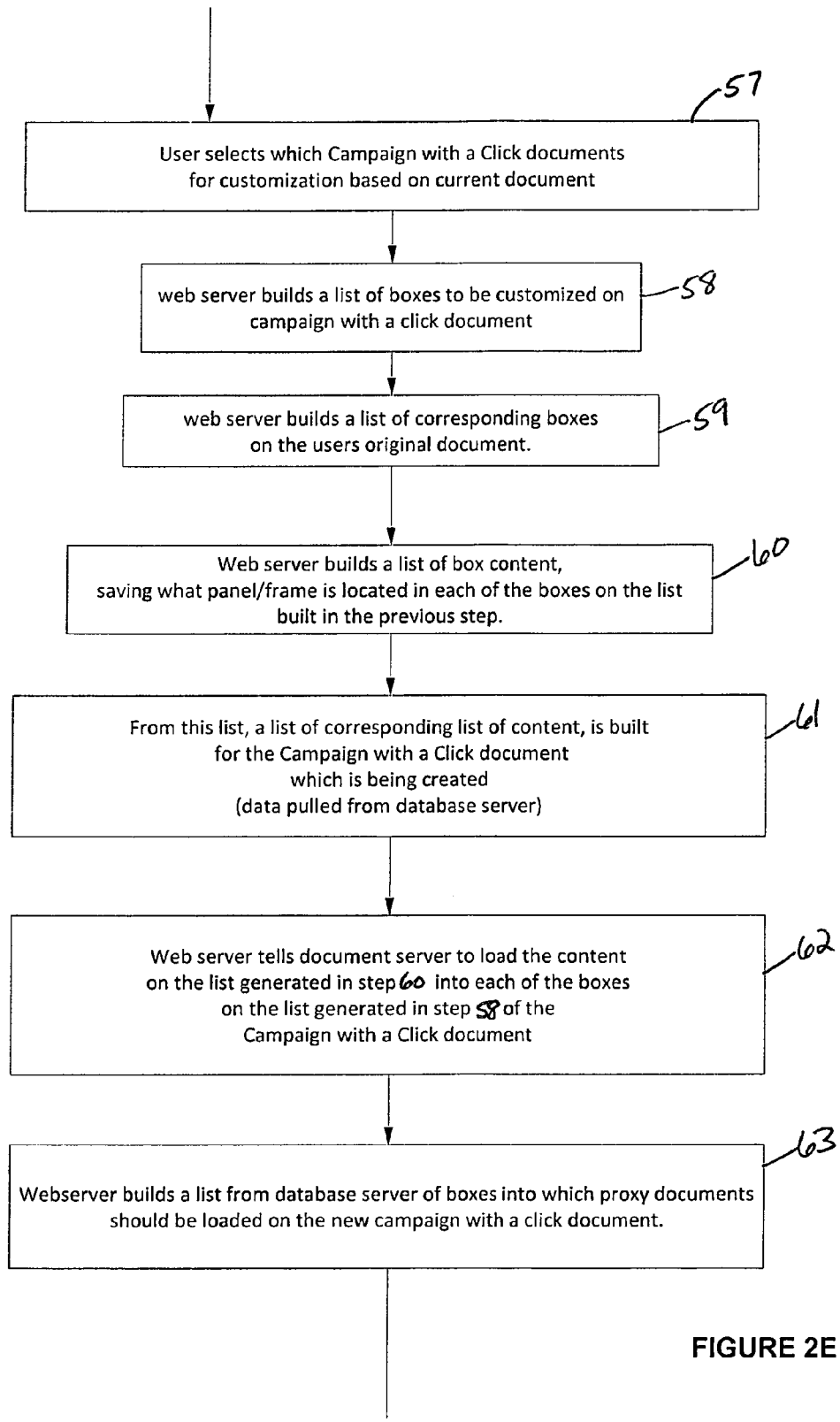
FIG. 2E is a fragmentary flowchart diagram depicting a sixth sequential series of processes according to the present invention.
Figure 2F:
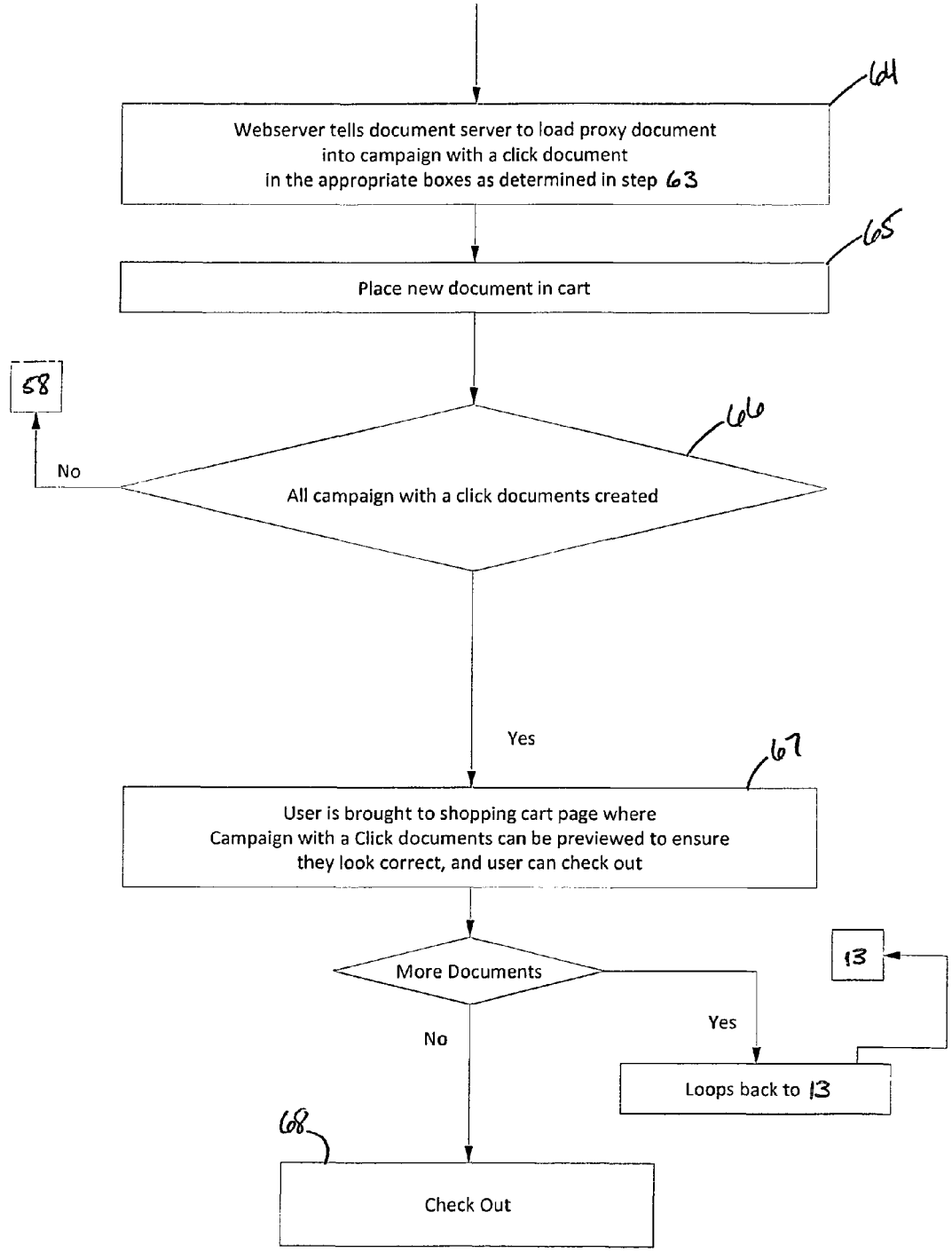
FIG. 2F is a fragmentary flowchart diagram depicting a seventh sequential series of processes according to the present invention.
Figure 5:
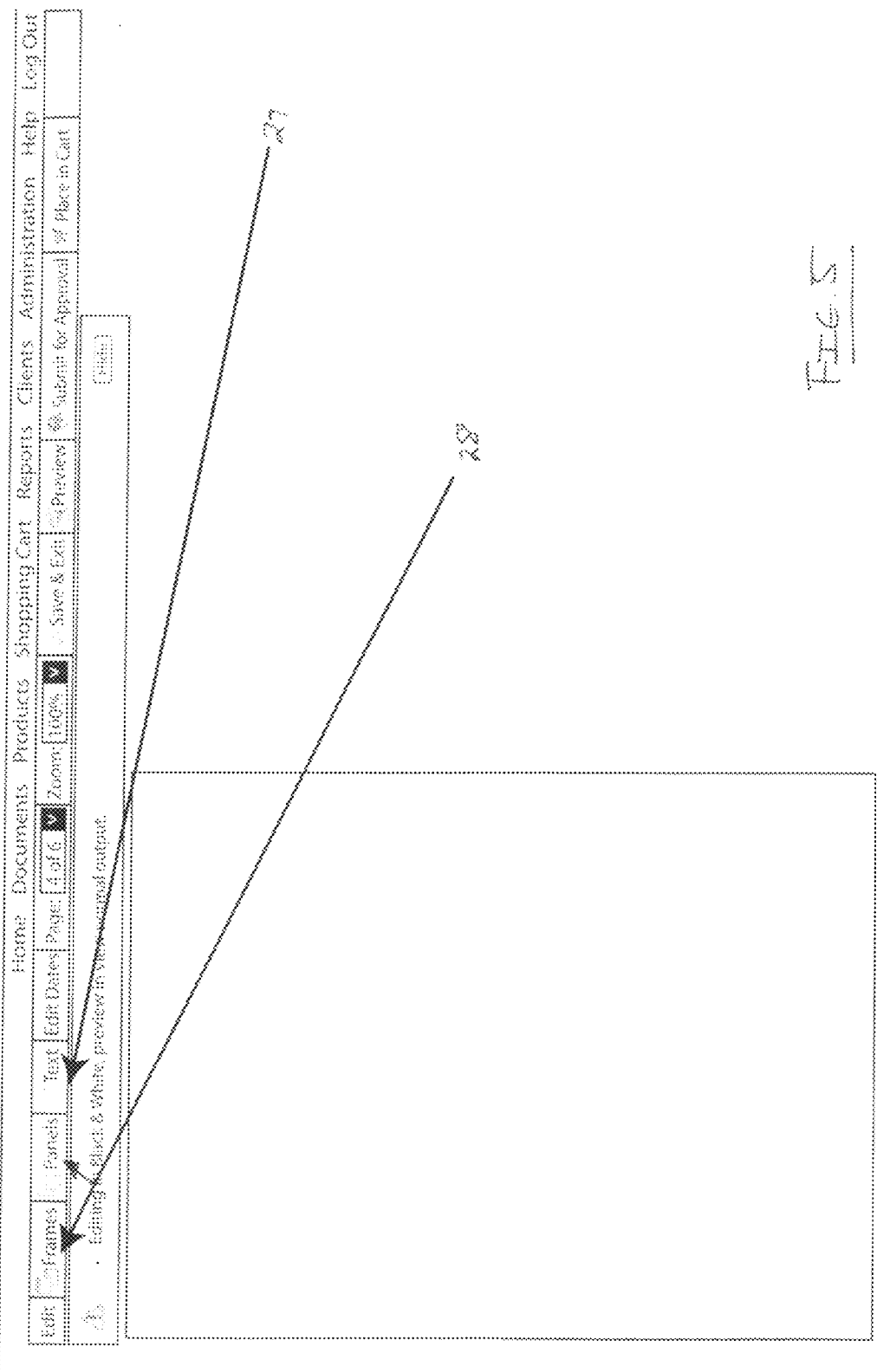
FIG. 5 is a screenshot depicting a stand-alone macrotemplate, editing page of the online portal according to the present invention.
Figure 6:
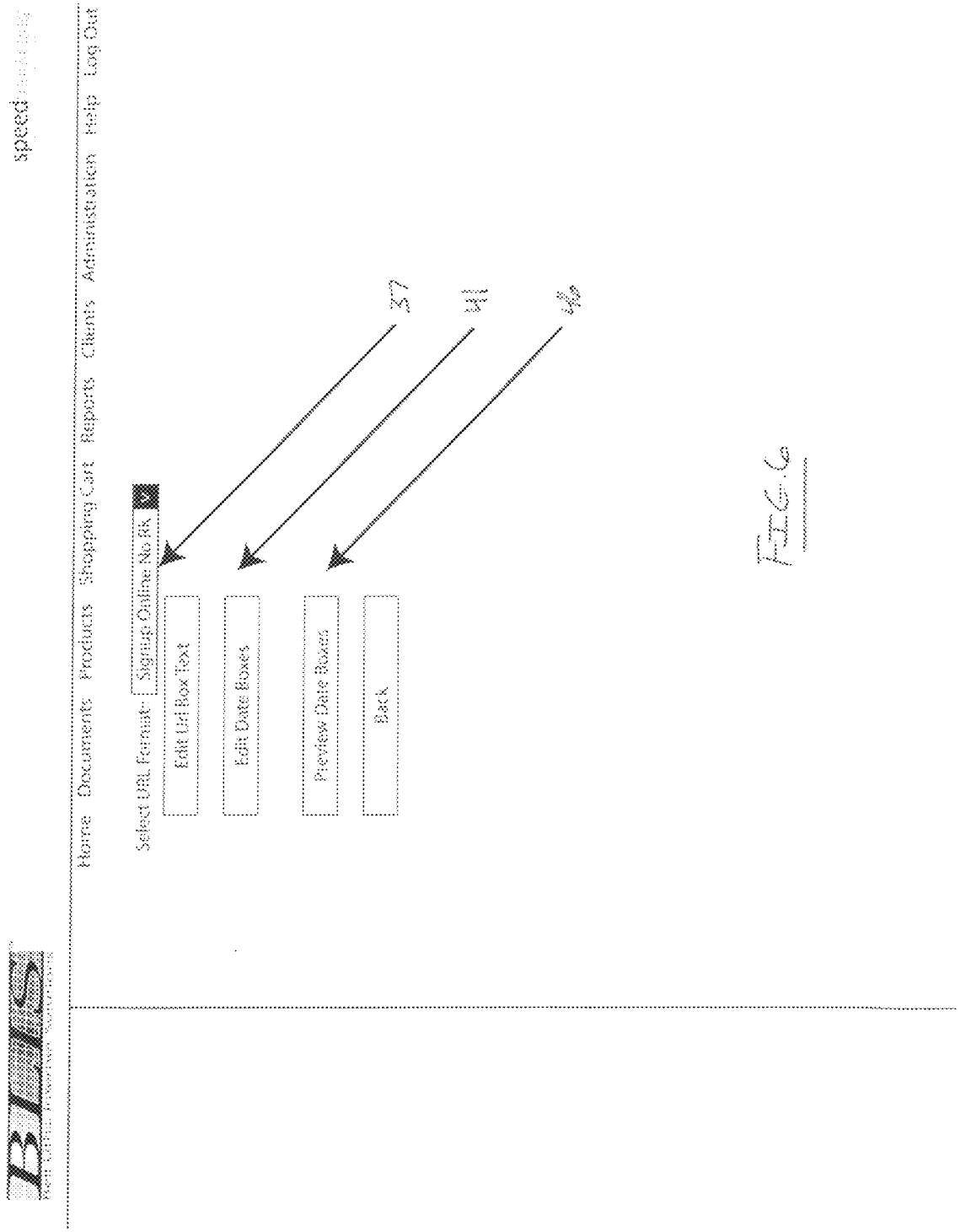
FIG. 6 is a screenshot depicting an edit options page of the online portal according to the present invention.
Figure 8:
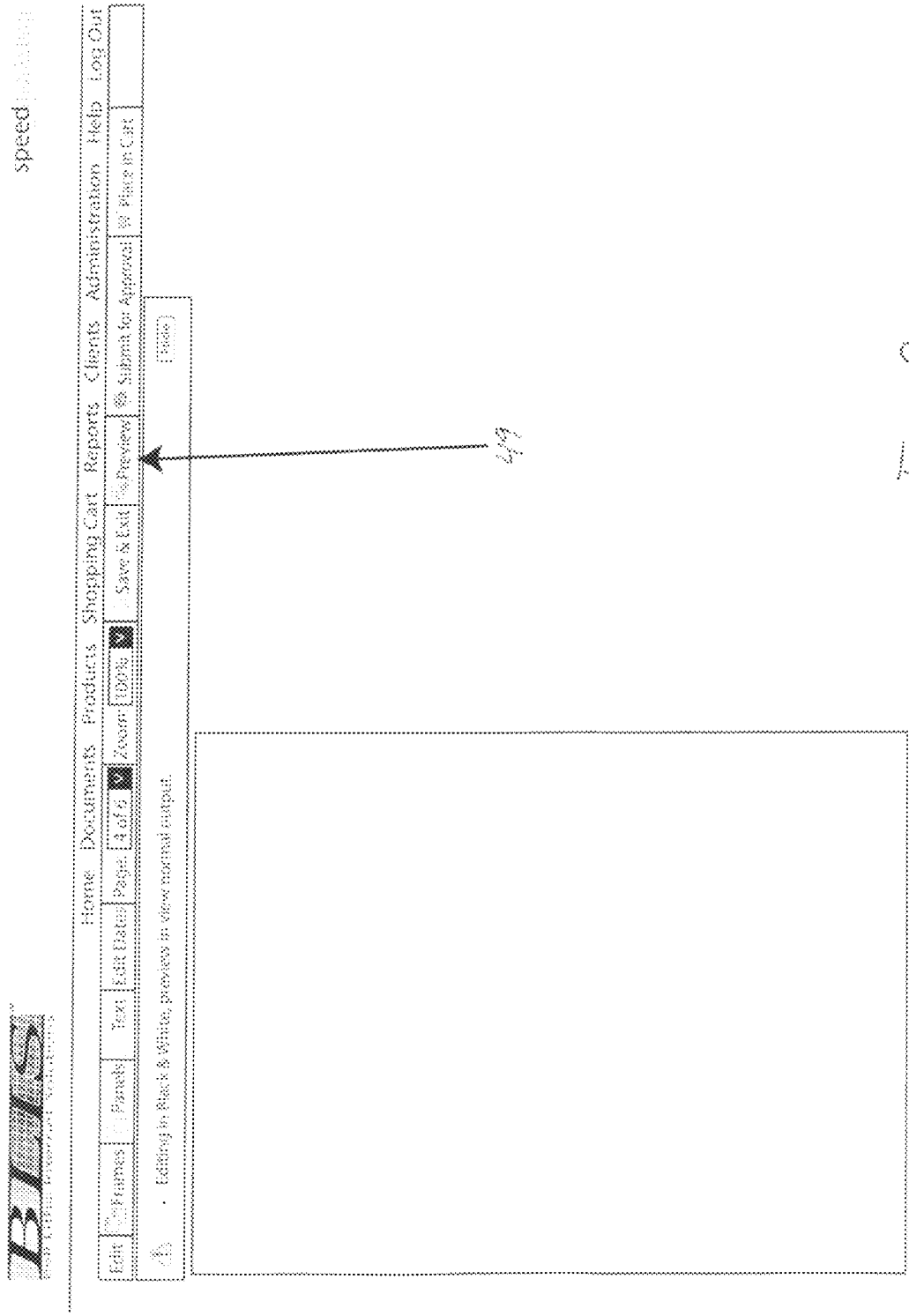
FIG. 8 is a screenshot depicting a preview page of the online portal according to the present invention.
Figure 9:
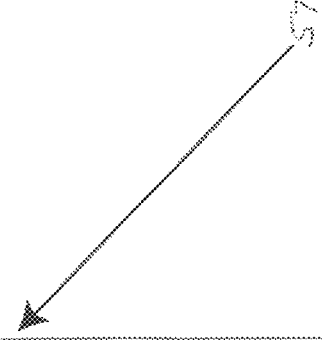
FIG. 9 is a screenshot depicting an order new documents page of the online portal according to the present invention.

The present invention contemplates and/or provides an on-line portal or web-site supported by a web server. The web server obtains a list of all promotions from a database server, separates the promotions by category, and builds a page to display previews of each promotion to the authenticated user as referenced at 11 in FIG. 2. The promotions are pre-compiled, approved (i.e. controlled) and typically branded promotions from a marketing source. The process starts by prompting the user to login to the online portal as referenced at 10 in FIG. 1. After the user inputs login data, the system authenticates the user by comparing the login information to a user data store. If the user provides valid credentials, the user is taken to the main page 12 of the online portal. The user selects a promotion from predetermined, approved location/client list as at 13.

The user, at the main page of the online portal, is provided with a number of prompts. One such prompt is a "create new document" prompt and when selected by the user operates to provide a selection of document templates broken into categories or groupings based upon document type (e.g. brochure 14, postcard 15, tent card 16, poster 17). The system then prompts the user to select document format(s) from among the available types as from 14, 15, 16, 17, for example.

The web server instructs the document server to create a new document based on promotion selected, and document data is inserted into the database server as at 20. The web server generates a list of clients from the database server, and builds a web page to display the list to the user as at 21. The system queries whether the document template requires a client location as at 18. If the document template requires a client location, the user then selects a client location from the list as at 19. The web server queries 23 the database server to determine if a logo file is associated with the selected client location.

If a logo file is associated with the selected client location, the web server then queries the database server to see if the document has any locations into which a logo should be inserted, and instructs the document server to load the logo into appropriate panels as at 24. Available client locations are provided to the user by way of the user's login information and authentication processes. Once the user selects a client location, the action will link the graphic logo to the documents to be created.

The web server then builds as at 25 a list of editable panels/frames on the document after retrieving necessary information from database server; this list is transformed into an html representation and rendered onto the editor page where the user can select which part they which to edit. The user may then choose as at 26 the text 27 or panel/frame as at 28, and if he or she so elects may as at 29 swap out the panel/frame 28. If a frame is swapped in as at 30, the web server queries the database server to see if the new frame contains a medium-proxy document panel. If the new frame contains a medium-proxy document panel or template, the user is enabled via an edit button to edit the medium-proxy document panel or template.

If a frame or panel is swapped in as at 31, the web server further queries the database server to see if the new frame/panel contains a logo image box. If the swapped in panel/frame does contain a logo image box, the web server queries the database server to determine if the client location associated with the document has a logo image as at 32. If the client location associated with the document has a logo image, the web server instructs the document server to load the logo image into the appropriate box on the swapped in panel as at 33. In other words, the logo is pre-populated based on the client location selection.

The user may then edit text as at 34. The web server then saves the text data to the database server after applying dynamic document server formatting as at 35. The web server instructs the dynamic document server to pull updated text data from the database server for insertion/rendering as at 36. The user responds to the edit medium-proxy template prompt by clicking the edit proxy document (prompt) button as at 37.

The web server then queries as at 38 the database server to determine whether a medium-proxy panel/template exists for the selected panel. If there is no existing medium-proxy panel/template, the web server instructs the dynamic document server to create an appropriate proxy document as at 39, and the user is re-directed to a medium-proxy panel/template setup page as at 40. The user may then select options to setup the medium-proxy panel/template, including formatting and general layout options as at 41.

The web server instructs the dynamic document server to make changes to the medium-proxy document based on layout/formatting options input by user in the previous step as at 42. The user may then input (text) data into medium-proxy panel/template based on layout chosen in previous steps as at 43. The web server saves textual data input to the database server as at 44, and the web server instructs the dynamic document server to render the medium-proxy document with all the user layout options and data input as at 45. The user may then preview as at 46 the medium-proxy panel/template to ensure that layout/data are correct. If the layout/data are correct, the user may click the insert button as at 47. If the layout/data are incorrect or unacceptable, the user may loop back to step 41.

The dynamic document server may then render a .pdf file of the medium-proxy panel/template, and then insert the .pdf file into an appropriate box on the original document as at 48. The user may then preview the composite document as at 49—if any further changes are desired, the user may return as at 50 to edit medium-proxy panel/template functionality at the selection criteria 26. If no further changes are desired, the user may place the medium-proxy panel/template (as potentially linkable to selected output formats), into a shopping cart as at 51 for checkout and/or further linkage and/or delivery/transmission.

With regard to the selected output formats, the web server queries as at 52 the database server to determine whether the promotional medium-proxy panel/template the user just placed in the shopping cart has associated/linked documents. If the medium-proxy panel/template has associated/linked documents, the web server redirects the user to select an additional documents page as at 53. If the medium-proxy panel/template has no associated/linked documents, the web server directs as at 54 the user to the checkout page as at 68.

The web server queries as at 55 the database server to determine which proxy-linked, variously formatted output document(s) are associated or linked to the original master document (comprising the medium-proxy template and an optional (locked for editing) branded microtemplate). The web server then builds a list as at 56 of "Campaign with a Click" documents associated with the promotion being ordered (the web server pulls this data from the database server), and eliminates any such documents that have a medium-proxy panel/template requirement not met by the user's document. If a Campaign with a Click document requires a proxy document to be customized and the user's promotion does not have that proxy document filled out/created, then that Campaign with a Click document is not displayed.

The user may then select as at 57 which Campaign in a Click documents he or she wants customized based on his or current medium-proxy panel/template. The web server builds as at 58 a list of boxes to be customized on the selected Campaign with a Click document(s), and from this list builds as at 59 a list of corresponding boxes on the user's original medium-proxy panel/template. The web server further builds as at 60 a list of box content, saving what panel/frame is located in each of the boxes on the list built in the previous step. From this list a list of corresponding content is built as at 61 for the Campaign with a Click document(s) being created (i.e. data is pulled from database server).

The web server instructs as at 62 the document server to load the content on the list generated in the previous step into each of the boxes on the list generated. The web server then builds as at 63 a list from the database server of boxes into which medium-proxy panel/template information should be loaded on the selected Campaign with a Click. document(s). The web server instructs as at 64 the dynamic document server to load the proxy panel/template into the designated Campaign with a Click documents in the appropriate boxes as determined.

All campaign documents created will have the option to go back to the box list building step until all requested Campaign in a Click documents have been'created and customized based on the user's original medium-proxy panel/template, placing each Campaign with a Click document in the cart as it is finished as at 65. Provided that all Campaign with a Click documents have been created (as at 66), the user is then directed to the shopping cart page as at 67 where the Campaign with a Click documents can be previewed to ensure they look correct, at which time the user is enabled to check out as at 68.

From a technical perspective, the medium-proxy document is indistinguishable from any other document in the system. The medium-proxy template or proxy document has a dynamic document server file as its basis, along with additional information about the document stored in the database server. From a functional perspective, however, the proxy document is much different from a user document in the system. In this regard, the reader should note certain differences between a user document and a proxy (or shadow) document according to the preset invention.

Firstly, the creation of a user document is done directly by the user—he/she selects which promotion (template) they want and a copy is created for the user to edit. A proxy document, on the other hand, is created when a user wishes to edit a specific part of a user document which has been designated to be replicable across other related documents.

When the proxy document is created, it is attached to the original user document in the database—all proxy documents must originate from and be attached to a user document—a user cannot just create a proxy document on its own. The reasons for this are manifold; without a user document to link the proxy document to, there is no way of knowing what purpose the proxy document serves—in which documents it should/can be included (i.e. proxy documents require context to be meaningful). Additionally, if users were required to manually create and assign proxy documents many of the advantages wrought by using the proxy document would be destroyed, namely timesaving and ease of use.

Another important distinction which separates a proxy document from a user document is the allowable content. Whereas user documents may contain any content, proxy documents are limited to text and vector graphics. This latter feature enables placement of the proxy document within any size document without having to change anything in the proxy document. Because vector graphics do not loose integrity when scaled up/down arbitrarily they must be used to ensure optimal print quality. Raster elements of Campaign with a Click must be replicated for each sized item where the element is to be placed. The advantage to this is method is the fact that one generated .pdf may be used to insert content into as many different types of documents as desired.

Previous techniques to solve the problem of synchronizing content and layout of portions of two different documents met with limited success. Several problems occurred during the development, the most intractable being the tracking of changes made after the initial creation of a Campaign with a Click document. It is easy enough to write code saying "If document 1 has section A, then when document 2 is created, ensure it gets corresponding section A, and all the content in document 1" basically having the content of document 1 mirrored during the creation phase of document 2.

What is difficult however, is keeping the changes synchronous between documents 1 and 2 if changes are made to document 1 after document 2 is created. This requires that document 1 have some sort of awareness of the existence of document 2 (and any additional potential documents). This becomes incredibly cumbersome on the back end because it requires additional checks to be performed whenever any change is made to document 1 (it needs to check should this change be made on another document, if so which document and where).

These processes consume or occupy server and database resources, and negatively impact user experience by causing longer load times. The proxy document solution, however, readily tracks changes across documents because all relevant documents are actually loading their content directly from the proxy document. Rather than having to make changes to each individual document, they can all be pointed to one proxy document which is then edited instead of the individual documents.

Another advantage to this approach is that it makes it much easier to add new documents to a Campaign with a Click Campaign—rather than having to import panels and frames for all possible layout variations of the new document, it only needs a blank box into which the proxy document can be inserted, and the proxy document itself contains layout variations. This also reduces the amount of space used in the database by a given document because again rather than storing a copy for each individual Campaign with a Click document, one copy is stored in the proxy document and then referenced by all related documents.

The largest issue with the proxy document solution is the fact that it does not work with raster graphics. The reason for this is the fact that the proxy document is placed in boxes of varying physical dimensions, and as such the quality of raster graphics will be degraded as they are scaled to different sizes than their original. There is no technical reason why raster graphics cannot be used in a proxy document, and if the original is sufficiently high resolution, the quality loss may be acceptable (i.e. the image is only ever being scaled down not up) depending on the application and final print quality. The work around for this is to create panels for each document in Campaign with a Click and track their correspondence in the database. This guarantees quality across documents at the expense of taking additional time to setup initially.

Both editable and non-editable portions of the original document are replicated to other related Campaign with a Click documents. Non editable elements may be either raster or vector. In the case that they are raster, corresponding elements (microtemplates) must be created for each print output size desired—That is to say if a logo appears as 1 inch squared on a memo pad, an 4 inches squared on an envelope, and the art is raster, then 2 microtemplates must be created to ensure high quality output. If however the output size is the same across documents then only one microtemplate is needed even if the graphic is raster. In the case of vector graphics, only one microtemplate is needed across documents.

It should be noted that non editable elements do not necessarily need a direct correspondence to each other—that is to say a matched element on document A can be 1×2, and the corresponding element on document B may be 3×2, although in general some sort of relation can be assumed (content wise). In the case of proxy documents, the size may vary across documents, but the aspect ratio must be maintained. Editable replicated sections of the macrotemplate are implemented via the proxy document described earlier. The proxy document section may have editable layout, editable text, and variable graphics (so long as they are vector).

It is possible to have a brand change on a document without the changes being reflected in related documents, if desired. One thing that should be noted is that changes in sections other than the proxy document section will not be reflected after related documents are created. That is to say if I create Document A, and then using Campaign with a Click create a related Document B, Document B will reflect the status of Document A when it was created. So if a brand is changed on Document A (not in a proxy document placed in A) after B is created, then the change will only be on A. Changes taking place in a proxy document section continue to be reflected across all documents created from the original document.

Figure 12:
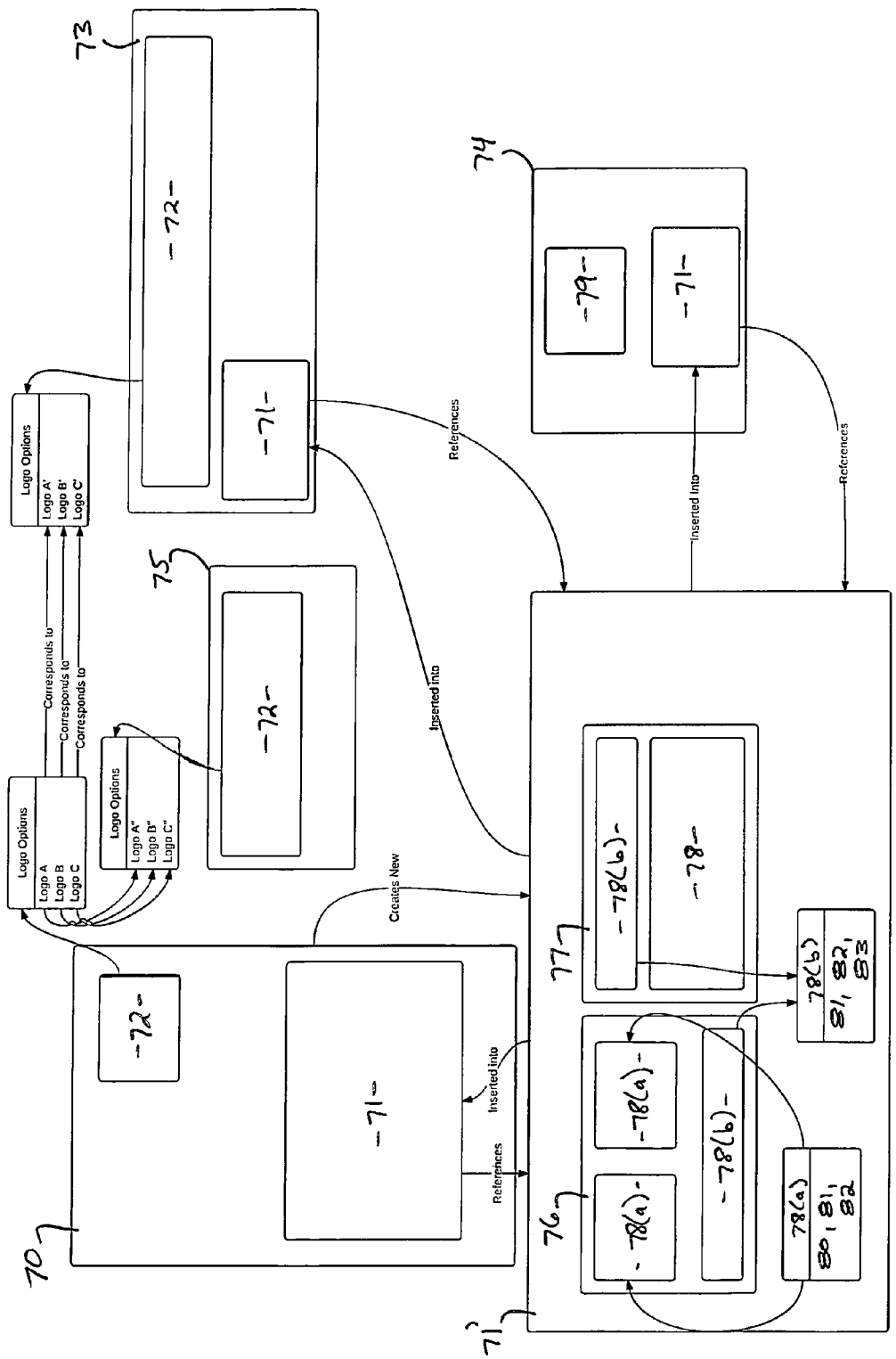
FIG. 12 is a flowchart type diagram showing a network of linked documents referencing a proxy template central to the practice of the present invention.

Referring now to FIG. 12, the starting point should be the original document 70. This is the first document created by the user for a Campaign with a Click. The reason it is the first rather than any other document is that it contains all linked elements for the Campaign with a Click. In other words, if something is linked on any of the Campaign with a Click documents, it must be present in document 70. This serves as the basis for subsequent campaign documents.

If document 70 were missing a linkable element, an element which is present in other campaign documents, then the link would be null because there is no input data to create the link. That being the, subsequent documents only need to have 1 linked element from the original document at minimum—in this example diagrammed, document 70 has 2 linked elements—the proxy document as at 71, and the brand logo as at 72, which is a linked microtemplate.

The reader should note that document 73 also contains 2 linked elements corresponding to the two the two linked elements on document 70, namely the proxy document as at 71 and the brand logo as at 72. Documents 74 and 75, however, each only have one linked element. Document 74 comprises a proxy document linked element 71, and document 75 comprises a brand logo linked element 72. At least one linked element is required otherwise the two documents in interest will be unrelated.

The enlarged proxy document section 71' on the bottom left of FIG. 12 shows an overview of a proxy document 71. Referencing section 71', it will be seen that a proxy document 71 can contain the same elements as a regular document, save for other proxy documents/linked elements as well as raster graphics. The two macrotemplates shown and referenced at 76 and 77 are not used simultaneously, but rather are meant to show how there can be layout variation within a proxy document 71 which will then be reflected on documents containing the proxy document 71 (e.g. documents 73 and 74).

It should be noted that when a proxy document 71 is inserted into another document, the information is not duplicated but rather referenced. As such, when changes are made to the proxy document 71, the changes will reflect in all documents referencing the proxy document 71. It should also be noted that while the output size of the proxy document 71 varies between Campaign with a Click documents, the aspect ratio does not vary given the use of vector graphics.

The linked microtemplate (in this case a brand logo 72, but it can be pretty much anything) is unrelated to the proxy document 71, but is still integral to Campaign with a Click methodology. The linked microtemplate (e.g. logo 72) is used instead of a proxy document 71 in the following cases: (1) Element contains raster artwork; (2) Element varies in aspect ratio between different Campaign with a Click documents; and (3) Document was retroactively converted to a Campaign with a Click document and original element was not setup as proxy document.

With the linked microtemplate, the data is duplicated between documents and not referenced. Because of this, changes are only reflected on initial campaign document creation. In other words, if the user creates document 73 based on document 70, and then changes the logo 72 in document 70 afterwards, document 73 will still have the logo document 70 had when document 70 was created.

While the foregoing specifications delineate much specificity, the same should not be construed as limiting the invention, but as providing a backdrop from which the essence of the present invention emerges. It is contemplated that the prevent invention essentially provides a networked system for enabling users to simultaneously create multi-formatted messages via an online portal.

The networked system is believed to essentially comprise certain platform-independent means for creating a digital, proxy template; means for authorizing selective access to the platform-independent means; storage means for storing data; ubiquitous means for continually monitoring and controlling the platform-independent means once accessed; means for selecting a series of output media formats, each output media format comprising a format-building rule set; linking means for linking selected output media formats to the medium-proxy template via the format-building rule set(s); and means for simultaneously building a series of output messages via the medium-proxy template, the selected series of output media formats, and the format-building rule sets (e.g. medium-proxy template referencing means, each selected output media format referencing the medium-proxy template such that changes made to the medium-proxy template are simultaneously rendered to the selected, output media formats), and a communication network.

The storage means comprise a user data store. The means for authorizing selective access to the platform-independent means authenticate a user's credentials against the user data store. The authenticated user's credentials provide selective access to the platform-independent means. The medium-proxy template is linked to the selected series of output media formats via the linking means. The means for authorizing selective access to the medium-proxy template enables select users to edit the medium-proxy template thereby simultaneously editing the series of output messages in real time. The means for continually monitoring and controlling the platform-independent means continually monitor and control medium-proxy template access, content, and distribution.

The networked system or online portal executable via a non-transitory, computer-readable medium storing a program via a computer processor may further preferably comprise certain means for variously publishing information compiled upon the medium-proxy template and referencing via a global communication network, the means for publishing information enabling the user to electronically send formatted output messages to select publisher(s) for publishing the output messages in varied output media via the communication network. Only non-transitory computer-readable media are contemplated to be within the scope of these specifications. In other words, the reader should note that when used hereinafter the term "computer readable media" is meant to embrace non-transitory computer-readable media comprising all computer-readable media except for a transitory, propagating signal(s).

The medium-proxy template is coupled with a select branding microtemplate via a master document or stand-alone macro-proxy template as at 70, the branding microtemplate being editably fixed for controllably brand-identifying select output messages. Select output messages are coupled with unlinked microtemplates as at 79 (e.g. text boxes), which unlinked microtemplates 79 enable the user to add free-form content adjacent to select output messages.

The proxy template may preferably comprise at least one, but possible more than one proxy-based macrotemplate as at 76 and 77. Each proxy-based macrotemplate preferably comprises least one proxy-based microtemplate as at 78, 78(*a*) and 78(*b*). The proxy-based microtemplate 78(*a*) may define parameters for free text 80, formatted text 81, and a vector graphic 82, whereas proxy-based microtemplate 78(*b*) may define parameters for formatted text 81, vector graphic 82 and vector graphic 83. Thus, it will be understood that each proxy-based microtemplate may be made editable via select tools, the select tools being selected from the group consisting of vector graphics tools, free text tools, and formatted text tools.

In terms of methodology, it is contemplated that the present invention provides a method for simultaneously creating multi-formatted messages via an online portal, which method comprises a series of steps including providing certain platform-independent means for creating a digital, medium-proxy template accessible via an online portal; authorizing selective access to the platform-independent means and access authorization means via the online portal; continually monitoring and controlling the platform-independent means once accessed; selecting a series of output media formats, each output media format comprising a format-building rule set; linking the selected output media formats to the medium-proxy template via the format-building rule set(s); and editing the medium-proxy template thereby simultaneously editing a series of output messages based on the selected output media formats in real time via the format-building rule sets.

The method may further comprise the steps of continually monitoring and controlling the editing process via the medium-proxy template and simultaneously built output messages; identifying various output media formats before selecting the series of output media formats; identifying various display types for each selected output media format, each identified display type comprising a display format-building rule set; identifying the physical location of incoming requests for access; modifying the format-building rule sets according to locale-specific parameters based on the identified physical location of incoming requests for access; selecting at least one publisher from a publisher data store; transmitting the series of edited output messages to the selected publisher(s) for publication; and publishing the proxy-based output messages in varied output media Accordingly, although the invention has been described by reference to a preferred systemic portal, it is not intended that the novel processes or systemic portal be limited thereby, but that modifications thereof are intended to be included as falling within the broad scope and spirit of the foregoing disclosure, the following claims and the appended drawings.

I claim:

1. A networked system for enabling users to create multi-formatted messages, the networked system comprising: a web server for creating a digital, proxy template, and for authorizing selective access to the web server; a database server for storing data; a means for selecting a series of output media formats, each output media format comprising a format-building rule set; a linking means for linking selected output media formats to the proxy template; a means for building a series of output messages as linked to (a) the proxy template, and (b) the selected series of output media formats; and a communication network, the database server comprising a user data store, the web server authenticating a user's credentials against the user data store, the authenticated user's credentials providing selective access to the proxy-creation means, the proxy template being linked to the selected series of output media formats via the linking means, the web server enabling select users to edit the proxy template thereby editing the series of output messages in real time, and for monitoring and controlling the proxy template access, content, and distribution.

2. The networked system of claim 1 wherein the means for building a series of output messages via the proxy template and the selected series of output media formats comprise proxy template referencing means, each selected output media format referencing the proxy template such that changes made to the proxy template are concurrently rendered to the selected, output media formats.

3. The networked system of claim 2 comprising a means for variously publishing information compiled upon the proxy template via the communication network, the means for publishing information enabling the user to electronically send formatted output messages to select publisher(s) for publishing the output messages in varied output media via the communication network.

4. The networked system of claim 2 wherein the proxy template is coupled with a select branding microtemplate upon a stand-alone macro-proxy template, the branding microtemplate being editably fixed for controllably brand-identifying select output messages.

5. The networked system of claim 2 wherein select output messages are coupled with unlinked microtemplates, the unlinked microtemplates for enabling a user to add free-form content to the output messages.

6. The networked system of claim 2 wherein the proxy template comprises at least one proxy-based macrotemplate, each proxy-based macrotemplate comprising at least one proxy-based microtemplate.

7. The networked system of claim 6 wherein each proxy-based microtemplate is editable via select tools, the select tools enabling vector graphics, free text, and formatted text.

8. A computer-readable medium storing a program for executing an online portal via a computer processor for enabling users to create multi-formatted messages in a global communications network, the online portal thereby providing:

a globally accessible means for creating a digital, proxy template; a means for authorizing selective access to the proxy template via the globally accessible means; a means for selecting a series of output media formats; a linking means for linking selected output media formats to the proxy template; and a means for building a series of output messages via the proxy template and the selected series of output media formats; the means for authorizing selective access to the proxy template authenticating a user's credentials, the authenticated user's credentials providing selective access to the proxy template, the proxy template being linked to the selected output media formats via the linking means, the means for authorizing selective access to the proxy template enabling select users to edit the proxy template thereby editing the output message(s) in real time, and for monitoring and controlling the proxy template access, content, and distribution.

9. The computer-readable medium of claim 8 wherein the means for building a series of output messages via the proxy template and the selected series of output media formats comprise proxy template referencing means, each selected output media format referencing the proxy template such that changes made to the proxy template are concurrently rendered to the selected, output media formats.

10. The computer-readable medium of claim 9 comprising a means for variously publishing information compiled upon the proxy template via a global communication network, the means for publishing information enabling the user to electronically send formatted output messages to select publisher(s) for publishing the output messages in varied output media via the communication network.

11. The computer-readable medium of claim 9 wherein the proxy template is coupled with a select branding microtemplate upon a stand-alone macro-proxy template, the branding microtemplate being editably fixed for controllably brand-identifying select output messages.

12. The computer-readable medium of claim 9 wherein select output messages are coupled with unlinked microtemplates, the unlinked microtemplates for enabling a user to add free-form content to the output messages.

13. The computer-readable medium of claim 9 wherein the proxy template comprises at least one proxy-based macrotemplate, each proxy-based macrotemplate comprising at least one proxy-based microtemplate.

14. The computer-readable medium of claim 13 wherein each proxy-based microtemplate is editable via select tools, the select tools enabling vector graphics, free text, and formatted text.

15. A computer-implemented method for creating multi-formatted messages, the computer-implemented method being executable by a computer processor and comprising the steps of:

providing proxy-creation means for creating a digital, proxy template;
authorizing selective access to the proxy-creation means via access authorization means;
selecting a series of output media formats;
linking the selected output media formats to the proxy template; and
editing the proxy template thereby editing a series of output messages based on the selected output media formats in real time.

16. The computer-implemented method of claim 15 comprising the step of continually monitoring and controlling the editing process via the proxy template and built output messages.

17. The computer-implemented method of claim 15 comprising the step of identifying various output media formats before selecting the series of output media formats.

18. The computer-implemented method of claim 17 comprising the step of identifying various display types for each selected output media format.

19. The computer-implemented method of claim 15 comprising the steps of:
identifying the physical location of incoming requests for access; and
modifying the output messages according to locale-specific parameters based on the identified physical location of incoming requests for access.

20. The computer-implemented method of claim 15 comprising the steps of:
selecting at least one publisher from a publisher data store;
transmitting the series of edited output messages to the selected publisher(s) for publication; and
publishing the proxy-based output messages in varied output media.

21. A computer-readable medium storing a computer-executable program for enabling users to create multi-formatted messages in a communications network via computer processing means, the computer-executable program providing a proxy template creation means for creating a digital, proxy template; an output media format selection means for selecting a series of output media formats, each output media format comprising a format-building rule set; a linking means for linking selected output media formats to the proxy template; and a means for building a series of output messages via the proxy template and the selected series of output media formats, wherein the proxy template is being linked to the selected output media formats via the linking means, and select users are being enabled to edit the proxy template and the output message(s) in real time.

22. The computer-readable medium of claim 21, wherein the means for creating a digital, proxy template is globally accessible.

23. The computer-readable medium of claim 21 further comprising a means for authorizing selective access to the proxy template, wherein the means for authorizing selective access to the proxy template authenticates a user's credentials, and the authenticated user's credentials provide selective access to the proxy template.

24. The computer-readable medium of claim 23, wherein the means for authorizing selective access to the proxy template enables select users to edit the proxy template and the output message(s) in real time.

25. The computer-readable medium of claim 23, wherein the means for authorizing selective access monitors and controls the proxy template access, content, and distribution.

\* \* \* \* \*